United States Patent
Saitoh et al.

(10) Patent No.: US 7,949,524 B2
(45) Date of Patent: May 24, 2011

(54) SPEECH RECOGNITION CORRECTION WITH STANDBY-WORD DICTIONARY

(75) Inventors: Daisuke Saitoh, Yokosuka (JP); Keiko Katsuragawa, Kawasaki (JP); Minoru Tomikashi, Yokohama (JP); Takeshi Ono, Yokosuka (JP); Eiji Tozuka, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 861 days.

(21) Appl. No.: 11/938,802

(22) Filed: Nov. 13, 2007

(65) Prior Publication Data

US 2008/0162137 A1 Jul. 3, 2008

(30) Foreign Application Priority Data

Dec. 28, 2006 (JP) .................................. 2006-354945

(51) Int. Cl.
*G10L 15/00* (2006.01)
*G10L 15/22* (2006.01)
(52) U.S. Cl. ......................... 704/235; 704/236; 704/251
(58) Field of Classification Search .................. 704/235, 704/236, 238, 240, 251, 255
See application file for complete search history.

(56) References Cited

U.S. PATENT DOCUMENTS

| | | | | |
|---|---|---|---|---|
| 4,559,604 A | * | 12/1985 | Ichikawa et al. | 704/236 |
| 5,909,667 A | * | 6/1999 | Leontiades et al. | 704/275 |
| 6,138,099 A | * | 10/2000 | Lewis et al. | 704/257 |
| 6,233,553 B1 | * | 5/2001 | Contolini et al. | 704/220 |
| 6,581,033 B1 | * | 6/2003 | Reynar et al. | 704/231 |
| 7,483,833 B2 | * | 1/2009 | Peters | 704/270 |
| 2005/0143999 A1 | * | 6/2005 | Ichimura | 704/251 |
| 2005/0283364 A1 | * | 12/2005 | Longe et al. | 704/257 |
| 2006/0293889 A1 | * | 12/2006 | Kiss et al. | 704/235 |
| 2007/0005372 A1 | * | 1/2007 | Huning et al. | 704/275 |
| 2007/0208567 A1 | * | 9/2007 | Amento et al. | 704/270 |
| 2008/0154600 A1 | * | 6/2008 | Tian et al. | 704/251 |

FOREIGN PATENT DOCUMENTS

JP 2001-306088 A 11/2001

* cited by examiner

*Primary Examiner* — Martin Lerner
(74) *Attorney, Agent, or Firm* — Young Basile

(57) ABSTRACT

At least one recognized keyword is presented to a user, and the keyword is corrected appropriately upon receipt of a correction for the presented result. A standby-word dictionary used for recognition of uttered speech is generated according to a result of the correction to recognize the uttered speech. Therefore, even if recognized keywords contain an error, the error can be corrected and uttered speech can be accurately recognized.

20 Claims, 24 Drawing Sheets

FIG. 6

| CLUSTER NO. | VOCABULARY-1 | VOCABULARY-2 | VOCABULARY-3 | VOCABULARY-4 |
|---|---|---|---|---|
| 1 | KOEN | KOFU | NOEN | --- |
| 2 | IIN+TOWER | INTER | CENTER | --- |
| 3 | ARENA | MARINA | --- | --- |
| n | TOKYO | TOKYU | KOKO | KUKO |

FIG. 7

| NO. | KEYWORD | SECOND-STAGE VOCABULARY SIZE |
|---|---|---|
| 1 | PARK | 1341 |
| 2 | YACHT | 164 |
| 3 | TOKYO | 2454 |
| 4 | TOKYU | 204 |
| 5 | KYOTO | 2052 |
| 6 | KOKO | 5645 |

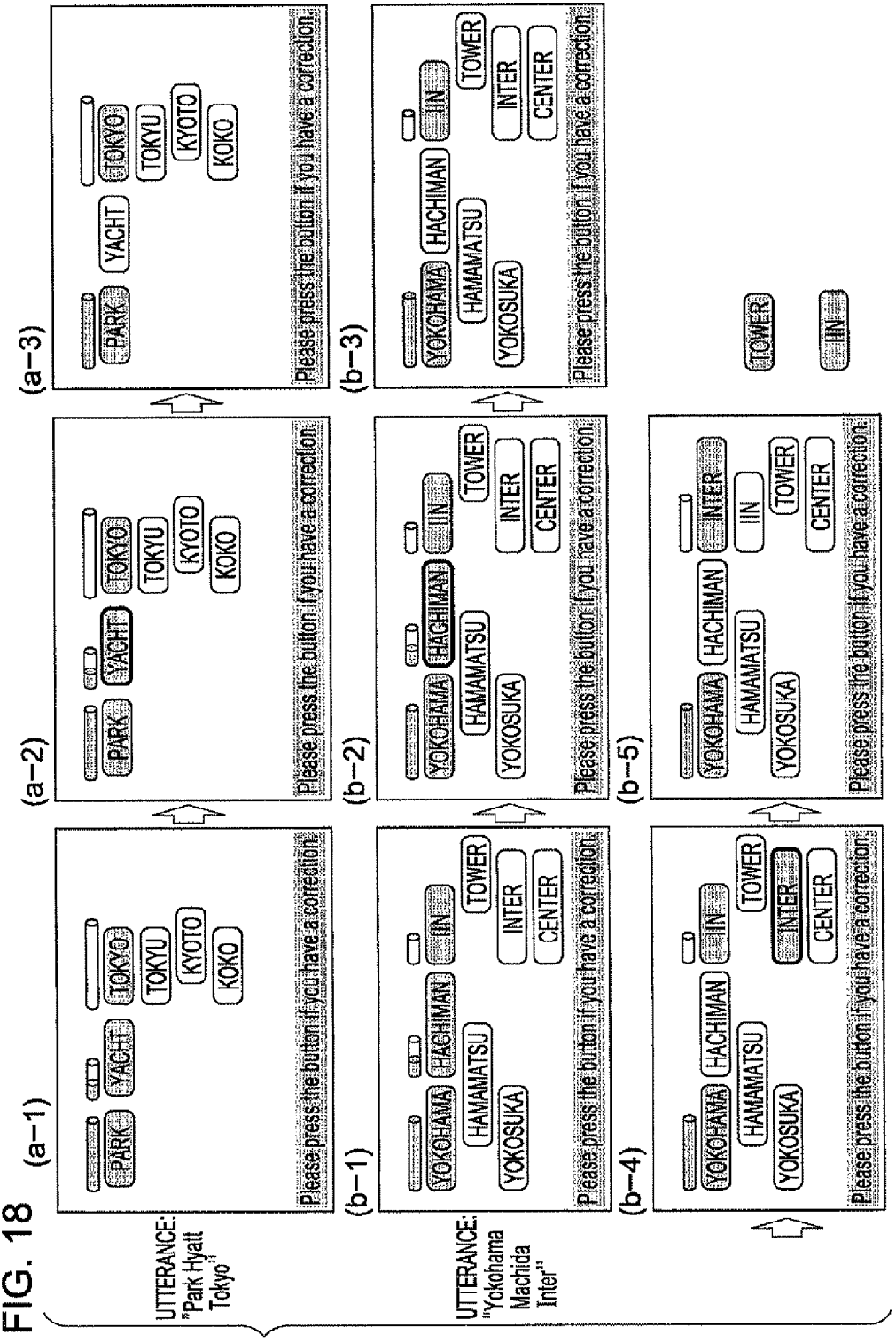

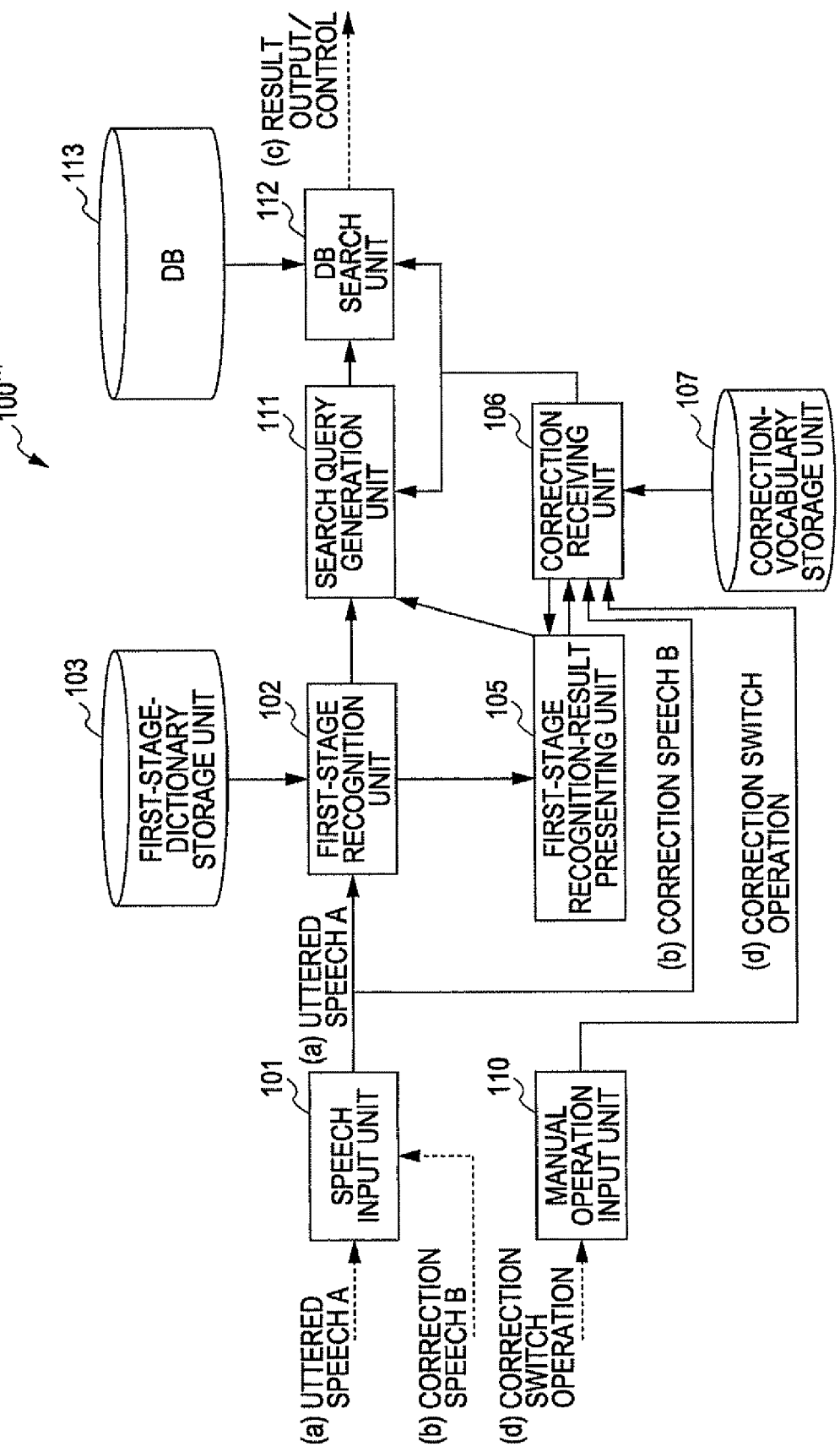

FIG. 20

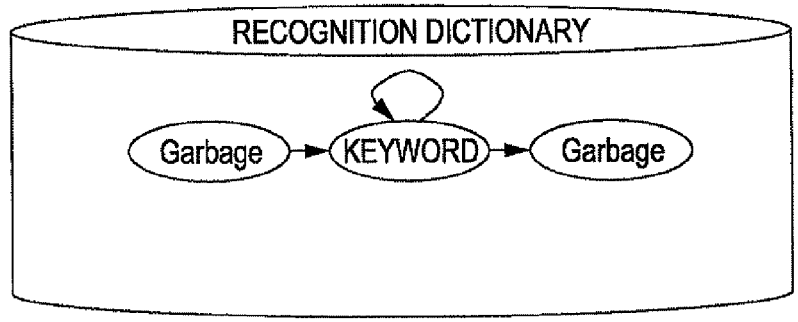

FIG. 21

| PREFECTURE | CITY/WARD/TOWN/VILLAGE | NAME OF FACILITY | PRONUNCIATION OF NAME OF FACILITY |
|---|---|---|---|
| HOKKAIDO | ASAHIKAWA CITY | ASAHIKAWA CITY HALL | ASAHIKAWA SHIYAKUSHO |
| | | ASAHIKAWA CITY PUBLIC HALL | ASAHIKAWA KOKAIDO |
| | : | : | : |
| | SAPPORO CITY | HOKKAIDO GOVERNMENT OFFICE | HOKKAIDO CHO |
| | | SAPPORO CENTRAL POLICE STATION | SAPPORO CHUO KEISATSUSHO |
| : | : | : | : |
| TOKYO | SHINJUKU WARD | TOKYO METROPOLITAN GOVERNMENT OFFICE | TOKYO TOCHO |
| | | SHINJUKU WARD OFFICE | SHINJUKU KUYAKUSHO |
| | : | : | : |
| | MINATO WARD | TOKYO TOWER | TOKYO TOWER |
| | | HAMAMATSUCHO STATION | HAMAMATSUCHO EKI |
| : | : | : | : |

FIG. 24

| NO. | SEARCH QUERY | ASSIGNED SCORE | SEARCH RESULT | RESULT EXAMPLE 1 | RESULT EXAMPLE 2 |
|---|---|---|---|---|---|
| 1. | YOKOHAMA ∩ LAND ∩ PARK ∩ TOWER | 100 | 0 | | |
| 2. | YOKOHAMA ∩ LAND ∩ PARK | 40 | 0 | | |
| 3. | YOKOHAMA ∩ LAND ∩ TOWER | 40 | 1 | Yokohama Landmark Tower... | |
| 4. | YOKOHAMA ∩ PARK ∩ TOWER | 40 | 0 | | |
| 5. | LAND ∩ PARK ∩ TOWER | 40 | 0 | | |
| 6. | YOKOHAMA ∩ LAND | 20 | 6 | Yokohama Landmark Tower | Yokohama Grand Intercontinental Hotel |
| 7. | YOKOHAMA ∩ PARK | 20 | 2 | Yokohama Royal Park Hotel | Hotel Parklane Yokohama |
| 8. | YOKOHAMA ∩ TOWER | 20 | 4 | Yokohama Landmark Tower | Yokohama Marine Tower |
| 9. | LAND ∩ PARK | 20 | 28 | Nasu Highland Park | Miki Horse Land Park |
| 10. | LAND ∩ TOWER | 20 | 2 | Yokohama Landmark Tower | Island Tower |
| 11. | PARK ∩ TOWER | 20 | 6 | Shinjuku Park Tower | Royal Park Shiodome Tower |
| 12. | YOKOHAMA | 5 | 1156 | Yokohama Landmark Tower | Yokohama Prince |
| 13. | LAND | 5 | 1214 | Yokohama Landmark Tower | Tokyo Disney Land |
| 14. | PARK | 5 | 972 | Fuji Safari Park | Yokosuka Research Park |
| 15. | TOWER | 5 | 79 | Yokohama Landmark Tower | Tokyo Tower |

[USER UTTERANCE]: TOKYO TOWER

[FIRST-STAGE PROCESSING]
PARALLEL RECOGNITION OF FIRST-STAGE RECOGNITION BASED ON
KEYWORD SPOTTING AND PHONEMIC RECOGNITION

[RECOGNITION RESULT]
KEYWORD = TOKYO
PHONEME STRING = to:cho:towa

[SECOND-STAGE PROCESSING]
DB SEARCH AND SCORING BASED ON RECOGNITION RESULTS

FIG. 25B

| PREFECTURE | CITY/WARD/TOWN/VILLAGE | ADDRESS | NAME OF FACILITY | PHONEME STRING | SCORE |
|---|---|---|---|---|---|
| HOKKAIDO | ASAHIKAWA CITY | 9-46, Rokujo-dori | ASAHIKAWA CITY HALL | asahikawashiyakusho | 10 |
| | | Tokiwa Koen | ASAHIKAWA CITY PUBLIC HALL | asahikawashiko:kaido: | 12 |
| | .. | .. | .. | .. | .. |
| | SAPPORO CITY | 6-1, Kitasanjo-Nishi, Chuo-ku | HOKKAIDO GOVERNMENT OFFICE | Hokkaido:cho: | 50 |
| | | 5-4, Kitaichijo-Nishi, Chuo-ku | SAPPORO CENTRAL POLICE STATION | sapporochu:o:keisatusho | 32 |
| .. | .. | .. | .. | .. | .. |
| TOKYO | SHINJUKU WARD | 8-1, Nishi-Shinjuku 2-chome | TOKYO METROPOLITAN GOVERNMENT OFFICE | to:kyo:tocho: | 240 |
| | | 4-1, Kabukicho 1-chome | SHINJUKU WARD OFFICE | shiNjukukuyakusho | 20 |
| | .. | .. | .. | .. | .. |
| | MINATO WARD | 2-8, Shiba-Koen 4-chome | TOKYO TOWER | to:kyo:tawa: | 560 |
| | | 4-12, Hamamatsucho 2-chome | HAMAMATSUCHO STATION | hamamatsucho:eki | 40 |
| .. | .. | .. | .. | .. | .. |

[SEARCH RESULT]: TOKYO TOWER

SPEECH RECOGNITION CORRECTION WITH STANDBY-WORD DICTIONARY

CROSS-REFERENCE TO RELATED APPLICATION

This application claims priority from Japanese Patent Application Serial No. 2006-354945, filed Dec. 28, 2006, which is incorporated herein in its entirety by reference.

TECHNICAL FIELD

The present invention relates to a speech recognition apparatus and method for recognizing speech.

BACKGROUND

A speech recognition apparatus is known from, for example, Japanese Unexamined Patent Application Publication No. 2001-306088. That speech recognition apparatus is configured to recognize input speech by, when words or phrases to be recognized are generated by concatenating a plurality of words with a hierarchical structure, recognizing high-order words using high-order templates and then recognizing low-order words using low-order templates corresponding to the high-order words.

BRIEF SUMMARY

Embodiments of a speech recognition apparatus and method are taught herein. One speech recognition method comprises, for example, receiving a speech utterance, presenting at least one keyword included in the speech utterance, correcting the at least one keyword, generating a standby-word dictionary according to a result of correcting the at least one keyword and recognizing the speech utterance using the standby-word dictionary.

BRIEF DESCRIPTION OF DRAWINGS

The description herein makes reference to the accompanying drawings wherein like reference numerals refer to like parts throughout the several views, and wherein:

FIG. 6 is a diagram showing an example of a table storing a combination of acoustically similar vocabulary words according to the first embodiment;

FIG. 7 is a diagram showing an example of the sizes of second-stage dictionaries corresponding to keywords according to the first embodiment;

FIG. 18 is a diagram showing a fifth example of the correction process using screen display and manual operation input according to the third embodiment;

FIG. 19 is a block diagram showing a structure of an aspect of a speech recognition apparatus according to a fourth embodiment of the invention;

FIG. 20 is a diagram showing an example of a first-stage dictionary according to the fourth embodiment;

FIG. 21 is a diagram showing an example of entries stored in a database according to the fourth embodiment;

FIG. 24 is a diagram showing an example of search queries and scores assigned thereto according to the fourth embodiment; and FIGS. 25A and 25B are diagrams showing an example of a scoring method based on phonemic recognition according to the fourth embodiment.

DETAILED DESCRIPTION OF EMBODIMENTS OF THE INVENTION

Known speech recognition apparatus configured to recognize high-order words and then recognize low-order words using low-order templates corresponding to the high-order words have a problem in that a recognition error occurring during the recognition of the high-order words causes erroneous recognition of the low-order words.

In contrast, in embodiments of the invention taught herein, at least one recognized keyword is presented to a user and is corrected appropriately upon receipt of a correction for the presented result. A standby-word dictionary used for recognition of uttered speech is generated according to a result of the correction to recognize the uttered speech. Therefore, even if recognized keywords contain an error, the error can be corrected and uttered speech can be accurately recognized.

Figure 1:
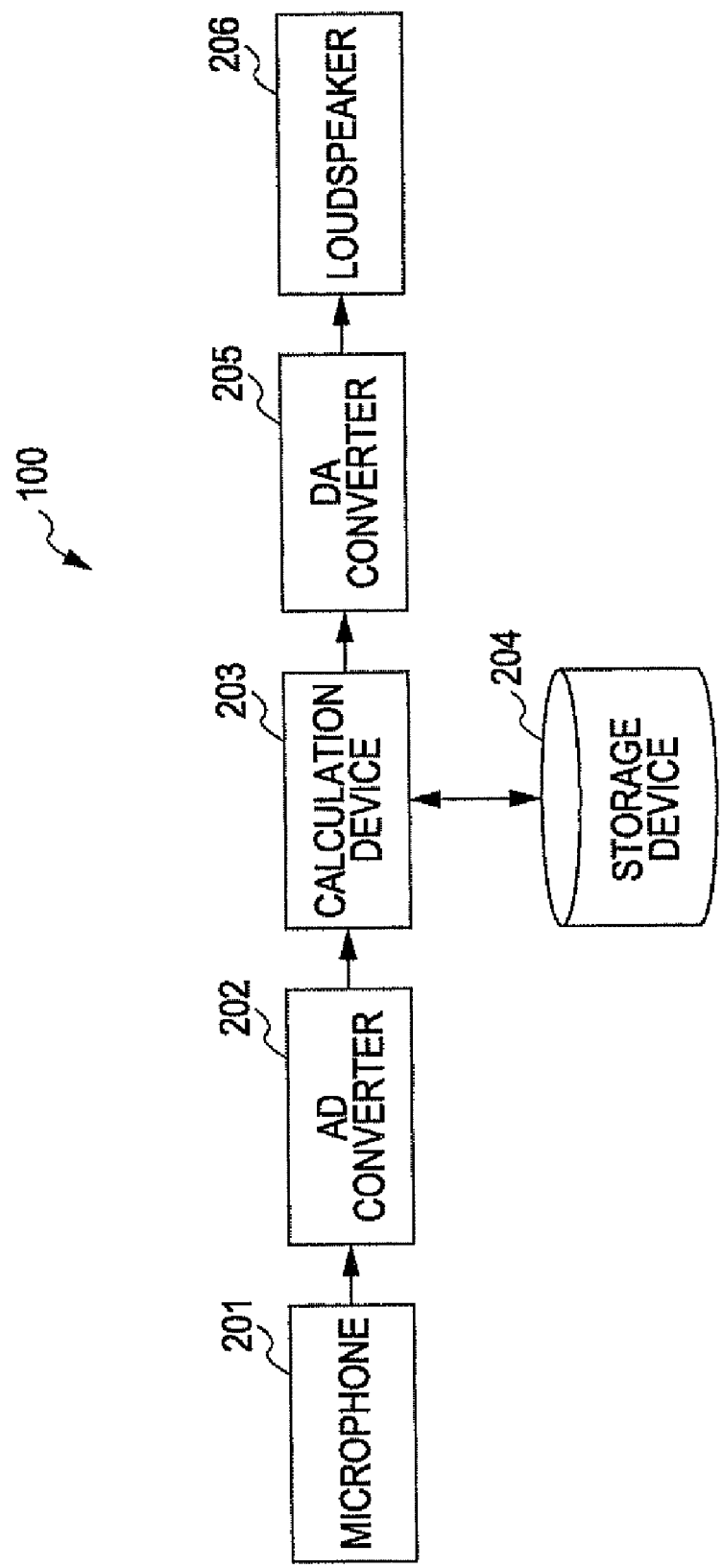
FIG. 1 is a diagram schematically showing a structure of an aspect of a speech recognition apparatus according to a first embodiment of the invention.

FIG. 1 is a schematic diagram showing a structure of an aspect of a speech recognition apparatus 100 according to a first embodiment of the invention. The speech recognition apparatus 100 includes a microphone 201, an analog-to-digital (AD) converter 202, a calculation device 203, a storage device 204, a digital-to-analog (DA) converter 205 and a loudspeaker 206.

The calculation device 203 is, for example, a microcomputer including a random access memory (RAM), a read-only memory (ROM) and a central processing unit (CPU) in addition to various input and output connections. Generally, the units described herein, and more particularly the control functions described herein for each of the units, are functional components of one or more software programs stored in ROM and are performed by execution by the CPU. The AD converter 202 and DA converter 205 are generally hardware input and output components coupled to the calculation device 203, and the storage device 204 is generally implemented in separate memory coupled to the calculation device 203, but can be incorporated in on-board memory of the microcontroller implementing the calculation device 203.

Figure 2:
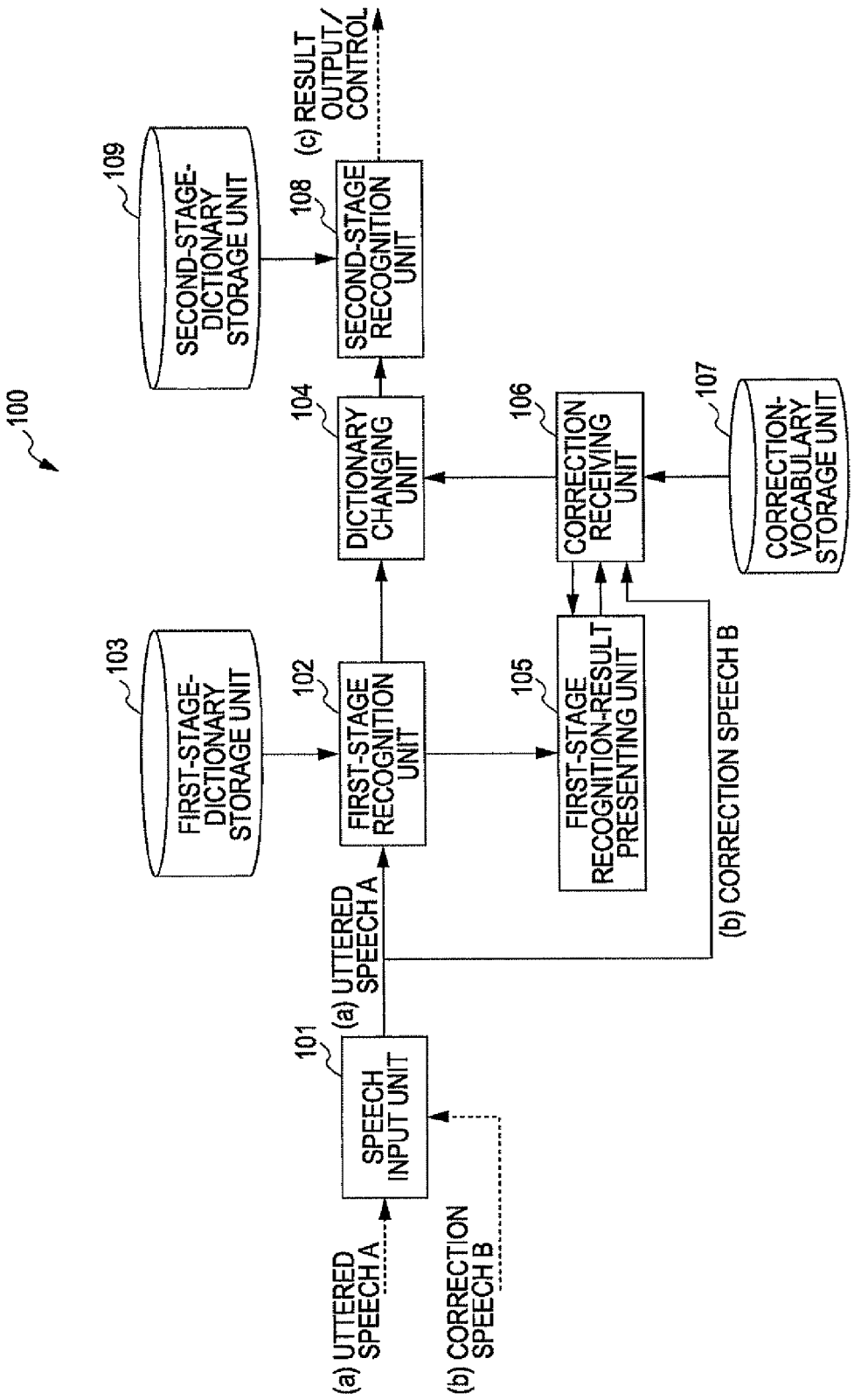
FIG. 2 is a block diagram showing a structure of another aspect of the speech recognition apparatus according to the first embodiment.

FIG. 2 is a block diagram showing a structure of another aspect of the speech recognition apparatus 100 according to the first embodiment. The speech recognition apparatus 100 includes a speech input unit 101, a first-stage recognition unit 102, a first-stage-dictionary storage unit 103, a dictionary changing unit 104, a first-stage recognition-result presenting unit 105, a correction receiving unit 106, a correction-vocabulary storage unit 107, a second-stage recognition unit 108 and a second-stage-dictionary storage unit 109. The elements shown in FIG. 2 are now described in correspondence with the components shown in FIG. 1.

The speech input unit 101 acquires speech A uttered by a user and correction speech B. The speech input unit 101 is implemented by the microphone 201 and AD converter 202 shown in FIG. 1, and is configured to convert analog speech signals of the uttered speech A and the correction speech B into digital speech signals and to output the digital speech signals to the first-stage recognition unit 102 and correction receiving unit 106, respectively.

The first-stage recognition unit 102 performs keyword-spotting recognition, which is known in the art, on a part or all of the uttered speech A input from the speech input unit 101 to recognize keyword candidates contained in the uttered speech A. The first-stage recognition unit 102 is implemented by the calculation device 203 shown in FIG. 1. The first-stage-dictionary storage unit 103 is a storage medium in which keyword-spotting dictionaries (first-stage dictionaries) used for keyword-spotting recognition by the first-stage recognition unit 102 are stored and is implemented by the storage device 204. The first-stage recognition unit 102 loads a keyword-spotting dictionary from the first-stage-dictionary storage unit 103 and performs keyword-spotting recognition. An example of the keyword-spotting recognition process using a keyword-spotting dictionary is next described with reference to FIGS. 3A and 3B.

Figure 3B:
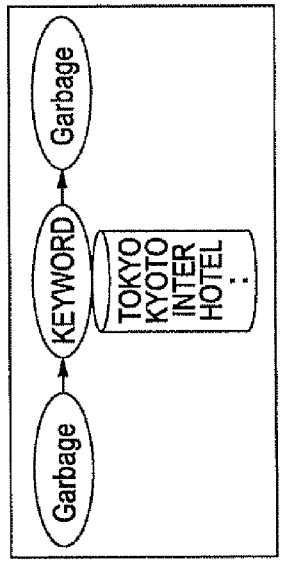
FIGS. 3A and 3B are diagrams showing an example of a keyword-spotting recognition process.
Figure 3A:
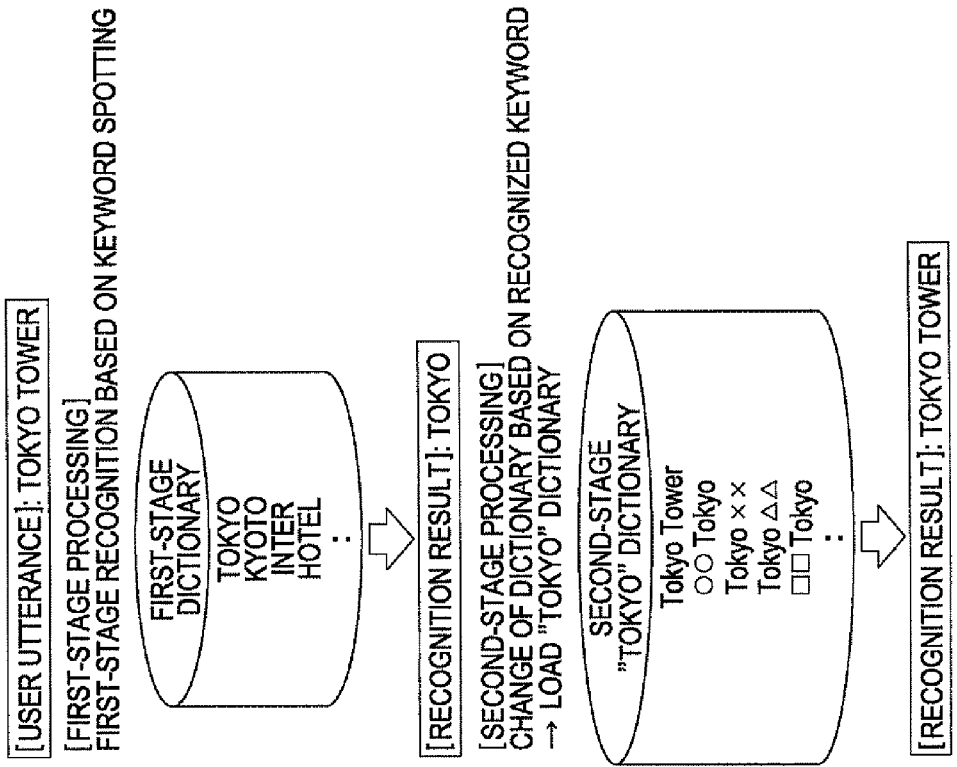

FIG. 3A is a diagram showing an example of a multi-stage recognition process including keyword spotting and word recognition when a speaker utters "Tokyo Tower." That is, FIG. 3A shows an example in which an input speech utterance is recognized by performing first-stage recognition by the first-stage recognition unit 102 and performing second-stage recognition by the second-stage recognition unit 108, described below.

The first-stage recognition unit 102 loads a keyword-spotting dictionary for recognizing a keyword from the first-stage-dictionary storage unit 103 and recognizes the keyword "Tokyo" contained in the speech utterance "Tokyo Tower." As shown in FIG. 3B, the keyword-spotting dictionary is in the form of a combination of "garbage+keyword+garbage" and helps a user recognize only a keyword from words or phrases including the keyword at the beginning, middle or end thereof. Garbage is a model used to absorb words other than keywords. The garbage model is generally used to appropriately absorb unnecessary words such as "uh" or grammatical words such as "in" of "the XXX Hotel in Tokyo."

For example, when "Tokyo Tower" is input, the first-stage recognition unit 102 performs first-stage processing using the keyword-spotting dictionary shown in FIG. 3B and selects the word "Tokyo" as a keyword candidate (recognized keyword candidate). In the first-stage recognition process, the "Tower" part is incorporated in the garbage model. In the second-stage recognition process performed by the second-stage recognition unit 108, described below, a recognition dictionary containing a collection of vocabulary entries including the recognized keyword candidate recognized by the first-stage recognition unit 102, e.g., "Tokyo Tower", "oo Tokyo", "Tokyo xx", etc., is loaded from the second-stage-dictionary storage unit 109, described below, and the speech utterance is re-recognized. Therefore, finally, the utterance "Tokyo Tower" is recognized.

The measure for selecting keywords in the above-described method may be based on common phonemes included in a predetermined number or more of words or phrases to be recognized. For example, words with common phonemes in names of places, such as "Tokyo" and "Yokohama", and words with common phonemes in types of facilities, such as "Hotel" and "Inter" (which stands for "highway interchange" are selected as keywords. Alternatively, words with common phonemes in sequences of words may be selected as keywords (e.g., "center" is common to both "culture center" and "shopping center", and therefore could be selected as a keyword). Common sequences of phonemes, such as "iin", which is common to "Yokohama Jin" ("Yokohama Iin" is a Japanese proper noun and "iin" is normally translated as "clinic") and "Atsugi Inter" ("Atsugi Inter" is a Japanese proper noun and "inter" means a highway interchange), may also be selected as keywords.

Referring again to FIG. 2, the dictionary changing unit 104 changes between standby-word dictionaries (second-stage dictionaries) used in second-stage recognition by the second-stage recognition unit 108, described below, on the basis of the recognized keyword candidate obtained in the first-stage recognition process performed by the first-stage recognition unit 102. The dictionary changing unit 104 basically changes between dictionaries based on the recognized keyword candidate obtained in the first-stage recognition process. However, if the correction receiving unit 106 receives the correction speech B, as described below, the dictionary changing unit 104 changes between dictionaries so as to reflect the content of the correction speech B. The dictionary changing unit 104 is implemented by the calculation device 203.

The first-stage recognition-result presenting unit 105 outputs the first-stage recognition result of the first-stage recognition unit 102, i.e., the recognized keyword candidate, to the user by voice. If the correction receiving unit 106, described below, receives correction for the first-stage recognition result, the first-stage recognition-result presenting unit 105 presents a corrected first-stage recognition result candidate to the user. The first-stage recognition-result presenting unit 105 is implemented by a combination of the DA converter 205 and the loudspeaker 206.

The correction receiving unit 106 recognizes the correction speech B produced by the user to generate correction information and outputs the generated correction information to the dictionary changing unit 104 and the first-stage recognition-result presenting unit 105. The correction speech B is a spoken utterance input by the user for correction after the user checks the first-stage recognition result candidate of the speech utterance A output from the first-stage recognition-result presenting unit 105 and finds an error contained in the recognition result. As described below, the correction receiving unit 106 combines a vocabulary stored in the correction-vocabulary storage unit 107 with the first-stage recognition result candidate to dynamically generate a correction-recognition dictionary used for recognition of the correction speech B and recognizes the correction speech B using the correction-recognition dictionary. The correction receiving unit 106 is implemented by the calculation device 203.

The correction-vocabulary storage unit 107 stores a vocabulary for generating a correction-recognition dictionary for use in recognition of the correction speech B by the correction receiving unit 106. The correction-vocabulary storage unit 107 is implemented by the storage device 204.

The second-stage recognition unit 108 loads a second-stage dictionary based on the dictionary designated by the dictionary changing unit 104 from the second-stage-dictionary storage unit 109. The second-stage recognition unit 108 re-recognizes the speech utterance A using the loaded second-stage dictionary. The second-stage recognition unit 108 is implemented by the calculation device 203.

The second-stage-dictionary storage unit 109 stores a recognition-target vocabulary used by the second-stage recognition unit 108 to recognize the initial utterance A. That is, the second-stage-dictionary storage unit 109 stores a group of second-stage dictionaries to be designated by the dictionary changing unit 104. The second-stage-dictionary storage unit 109 is implemented by the storage device 204. In the first embodiment, dictionaries corresponding to all keywords may be statically stored in advance in the second-stage-dictionary storage unit 109, and the second-stage recognition unit 108 may load a second-stage dictionary based on the dictionary designated by the dictionary changing unit 104. Alternatively, each time a keyword is acquired, a new second-stage dictionary including the keyword may be dynamically generated (or organized).

Figure 4:
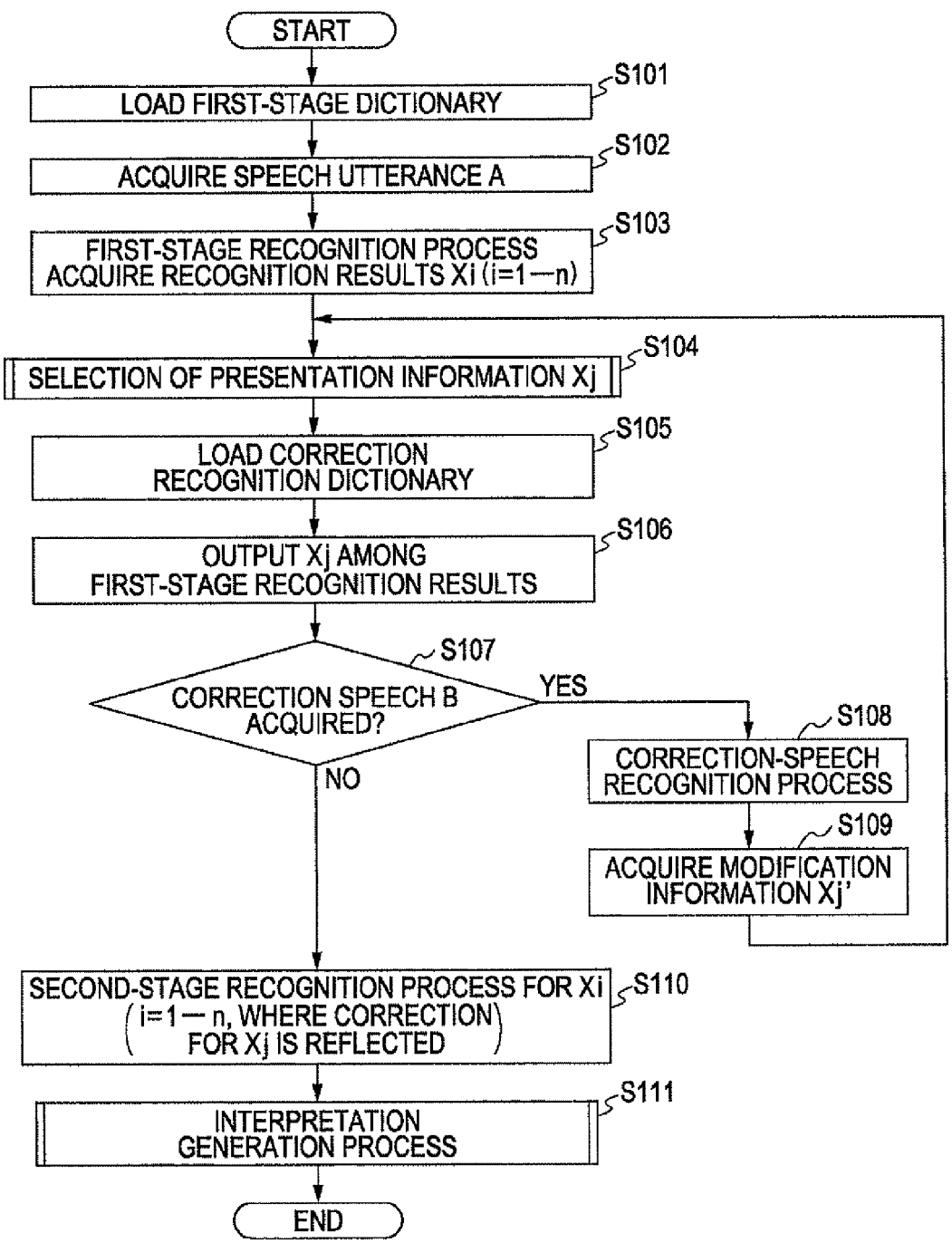
FIG. 4 is a flowchart showing a process of the speech recognition apparatus according to the first embodiment.
Figure 5:
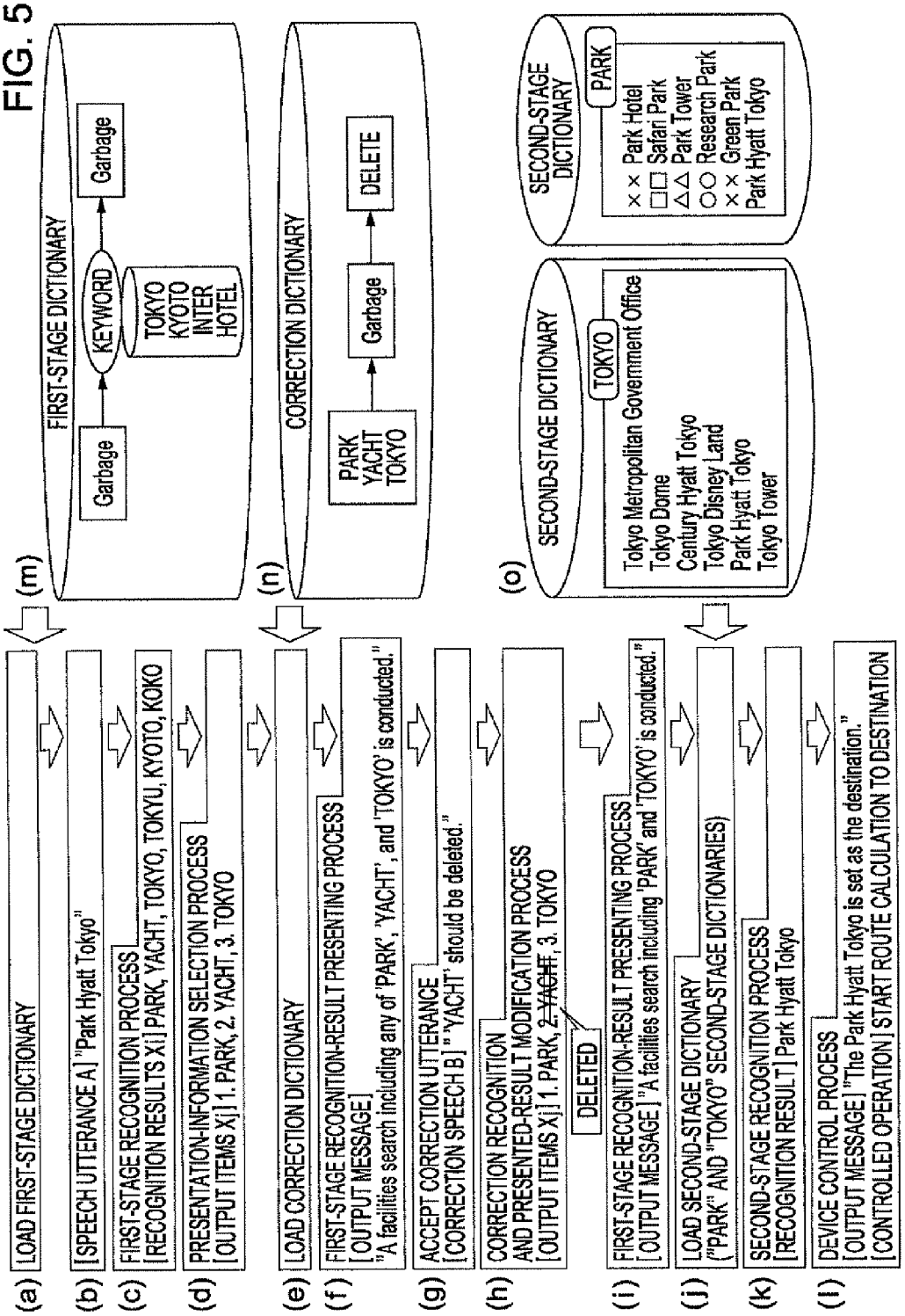
FIG. 5 is a diagram showing flow of the process of the speech recognition apparatus according to the first embodiment.

The flow of a process of the speech recognition apparatus 100 according to the first embodiment is next described with reference to FIGS. 4 and 5. FIG. 5 is a diagram showing the relationship between user utterances and system responses according to a flowchart shown in FIG. 4. In FIG. 5, parts (a) to (l) show transactions between the system, the user and the internal processing states of the system, while parts (m), (n) and (o) show dictionaries developed as recognition targets by the system in the steps of parts (a), (e) and (j), respectively.

In step S101, as shown in part (a) of FIG. 5, the first-stage recognition unit 102 loads a first-stage dictionary from the first-stage-dictionary storage unit 103. For example, as described above, the keyword-spotting dictionary shown in part (m) of FIG. 5 is loaded as the first-stage dictionary. Then, in step S102, the first-stage recognition unit 102 acquires a speech utterance A input by the user via the speech input unit 101. As shown in part (b) of FIG. 5, for example, speech data of "Park Hyatt Tokyo" uttered by the user is acquired as the speech utterance A. Then, the process proceeds to step S103.

In step S103, the first-stage recognition unit 102 performs first-stage recognition using the keyword-spotting dictionary and acquires n possible recognized keywords, i.e., first-stage recognition result candidates Xi (i=1 to n). For example, as shown in part (c) of FIG. 5, six possible recognized keywords "PARK", "YACHT", "TOKYO", "TOKYU", "KYOTO" and "KOKO" (which is a Japanese noun meaning "high school") as the first-stage recognition result candidates Xi. The first-stage recognition unit 102 outputs the acquired first-stage recognition result candidates Xi to the dictionary changing unit 104 and the first-stage recognition-result presenting unit 105. Then, the process proceeds to step S104.

In step S104, the first-stage recognition-result presenting unit 105 selects keywords to be presented to the user, i.e., presentation-target recognition results Xj (where j denotes the index of a recognition result to be presented), from among the first-stage recognition result candidates Xi acquired by the first-stage recognition unit 102. The first-stage recognition-result presenting unit 105 assigns priority to the first-stage recognition result candidates Xi based on an index such as recognition score or recognition order and selects one or a plurality of high-priority keywords as presentation-target recognition results Xj. In the first embodiment, as described below, priority is assigned to the first-stage recognition result candidates Xi based on the recognition score of each keyword, and the presentation-target recognition results Xj are selected.

When a plurality of keywords are selected as the presentation-target recognition results Xj, too many keywords presented to the user might confuse the user, so only several highest-priority keywords could be presented. For example, as shown in part (d) of FIG. 5, the first-stage recognition-result presenting unit 105 selects three keywords "1. PARK", "2. YACHT" and "3. TOKYO" as the presentation-target recognition results Xj from among the keywords obtained as the first-stage recognition results Xi. The first-stage recognition-result presenting unit 105 outputs the selected presentation-target recognition results Xj to the correction receiving unit 106. Then, the process proceeds to step S105.

In step S105, the correction receiving unit 106 combines the input presentation-target recognition results Xj with the correction vocabulary stored in the correction-vocabulary storage unit 107 to configure a correction-recognition dictionary as a standby dictionary for the correction speech B uttered by the user, as described below, and loads the correction recognition dictionary (see part (e) of FIG. 5). "Delete" or other word(s) may be uttered by the user as correction speech B to remove an erroneously recognized keyword from the presentation-target recognition results Xj.

For example, "'YACHT' should be deleted" or the like may be input as the correction speech B. As shown in, for example, part (n) of FIG. 5, the correction receiving unit 106 combines the keywords "PARK", "YACHT" and "TOKYO" selected as the presentation-target recognition results Xj and the correction vocabulary word "DELETE" with the garbage model to generate a correction recognition dictionary. Therefore, when "'YACHT' should be deleted" is input as the correction speech B, the correction receiving unit 106 can recognize the correction speech B using the correction dictionary.

Conversely, "SET" or other word(s) may be uttered by the user as the correction speech B to ensure a keyword is selected from among the presentation-target recognition results Xj. The word "SET" is included in the correction vocabulary stored in the correction recognition dictionary, thus allowing the correction speech B, such as "'TOKYO' should be set" to be accepted. Alternatively, in the system configured to accept only the word "DELETE" as correction speech B, a message such as "Please say an item to be deleted, if any" may be output so that the presentation-target recognition results Xj can be simply received using the correction-recognition dictionary.

To reduce the risk of a recognition error caused by receiving correction utterances only by voice, a correction recognition dictionary can be generated so that only simple vocabulary words such as "DELETE" and "SET", described above, can be accepted as the correction vocabulary words. More sophisticated correction such as correction of the appearance position, e.g., the beginning or end, and correction of search conditions including a plurality of keywords combined with the logical OR or AND may be effective if a display device or the like is additionally used. Such more sophisticated correction with the additional use of a display device is described below with respect to a third embodiment of the invention.

After step S105, the process proceeds to step S106, in which the first-stage recognition-result presenting unit 105 outputs the presentation-target recognition results Xj selected in step S104 from among the first-stage recognition result candidates Xi to the user. For example, a system utterance in which the presentation-target recognition results Xj are simply listed, such as "A facilities search including any of 'PARK', 'YACHT', and 'TOKYO' is conducted" shown in part (f) of FIG. 5, is output and the presentation-target recognition results Xj are presented to the user.

Alternatively, after the presentation-target recognition results Xj are listed, the "Is that OK?" prompt may be output to the user, or, as described above, based on the assumption that only the word "DELETE" or "SET" is accepted as correction speech B, a system utterance such as, "Please say an item to be corrected or set, if any," may be output after the presentation-target recognition results Xj are listed. Further, a system utterance that allows the user to select one of the plurality of presentation-target recognition results Xj, e.g., "Which do you choose, XXX or YYY?", may be output.

Then, the process proceeds to step S107, in which the correction receiving unit 106 determines whether or not the correction speech B has been input, i.e., whether or not the correction speech B has been acquired. If the correction speech B has been input, the process proceeds to step S108. In step S108, the correction receiving unit 106 performs speech recognition on the correction speech B using the correction recognition dictionary described above. For example, as shown in part (g) of FIG. 5, when "'YACHT' should be deleted" is input as the correction speech B, the recognition result "YACHT—(garbage)—DELETE" is obtained using the correction recognition dictionary shown in part (n) of FIG. 5. Then, the process proceeds to step S109.

In step S109 the correction receiving unit 106 generates correction information based on the result of recognizing the correction speech B. For example, when "YACHT—(garbage)—DELETE" is recognized, correction information Xj', here "keyword=YACHT and correction type=DELETE", is generated and acquired. The generated correction information Xj' is output to the dictionary changing unit 104 and the first-stage recognition-result presenting unit 105. Then, the process returns to step S104, in which the first-stage recognition-result presenting unit 105 modifies the presentation-target recognition results Xj according to the input correction information Xj'. For example, as shown in part (h) of FIG. 5, the result "2. YACHT" is deleted from the presentation-target recognition results Xj, and new presentation-target recognition results Xj is generated.

If no correction speech B has been input, the correction receiving unit 106 outputs the presentation-target recognition results Xj to the dictionary changing unit 104. Then, the process proceeds to step S110. For example, in step S106, the first-stage recognition-result presenting unit 105 may output a system query utterance such as, "Would you like to start a facilities search including any of 'PARK', 'YACHT', and 'TOKYO'?", and may present the presentation-target recognition results Xj to the user. In this case, if an affirmative utterance such as "Yes" is recognized, the process proceeds to step S110.

In step S110 the dictionary changing unit 104 develops a second-stage dictionary based on the input presentation-target recognition results Xj. For example, as shown in part (j) of FIG. 5, the dictionary changing unit 104 generates a second-stage dictionary composed of vocabulary entries including the presentation-target recognition results Xj, where the correction information Xj', here "keyword=YACHT and correction type DELETE", is reflected, i.e., the keywords "PARK" and "TOKYO". Specifically, as shown in part (o) of FIG. 5, the dictionary changing unit 104 changes between second-stage dictionaries for use in the second-stage recognition process by retrieving a 'PARK' second-stage dictionary that is a set of vocabulary entries including the keyword "PARK" and a 'TOKYO' second-stage dictionary that is a set of vocabulary entries including the keyword "TOKYO" from the second-stage-dictionary storage unit 109.

Then, the second-stage recognition unit 108 loads the 'PARK' second-stage dictionary and the 'TOKYO' second-stage dictionary and performs second-stage recognition on the speech utterance A. That is, the second stage recognition unit 108 determines the result of recognizing the speech utterance A using the 'PARK' second-stage dictionary and the result of recognizing the speech utterance A using the 'TOKYO' second-stage dictionary. Then, the process proceeds to step S111, in which the second-stage recognition unit 108 reorganizes the recognition results obtained from the second-stage dictionaries to generate an interpretation, which is the final recognition result. For example, as shown in part (k) of FIG. 5, "Park Hyatt Tokyo" is generated as the interpretation. Then, the process ends.

The speech recognition apparatus 100 can be used in a navigation system. As shown in part (1) of FIG. 5, in the navigation system the destination spoken by the user is specified on the basis of the interpretation generated by the second-stage recognition unit 108, and voice guidance relating to the setting of the destination and route calculation to the destination are performed.

A method for assigning priority to select the presentation-target recognition results Xj in step S106 described above and a method for presenting the presentation-target recognition results Xj according to the priority is now described with respect to four examples: first, a priority assignment method based on recognition scores; second, a method focusing on combinations of confusable vocabulary words; third, a method focusing on the efficiency in narrowing down second-stage dictionaries and fourth, a method for resolving a conflict between first-stage recognition candidates.

1. Priority Assignment Method based on Recognition Scores

In the first method, high priority is assigned to a vocabulary word having a recognition score within a predetermined range. The recognition score represents the index of confidence for each of the vocabulary words (the first-stage recognition result candidates Xi) extracted as recognition candidates by the speech recognition system. A candidate with a higher recognition score is a vocabulary word with a lower probability of being corrected. The recognition scores may be based on, for example, reliability. The reliability can be calculated using typical likelihood (acoustic likelihood or linguistic likelihood) output from the speech recognition system, normalized likelihood focusing on the difference or ratio between likelihoods of competitive words (candidate vocabulary words that are output at the same time), word posterior probability or any other method known to those of skill in the art. Such reliability calculation methods are known in the art and are not described herein.

With the use of the first method, the first-stage recognition-result presenting unit 105 sets high priority to a first-stage recognition result candidate Xi whose recognition score based on reliability is within a predetermined range and selects the high-priority first-stage recognition result candidate Xi as a presentation-target recognition result Xj. The predetermined range may be, for example, a range of recognition scores having recognition rates ranging from 40% to 95%. Correspondences between the recognition rates and the recognition scores can be statistically determined using a corpus of speech or the like. Preferably, the upper and lower limits of the recognition scores are adjusted according to the environment where the system is applied or the performance of the system.

In the case of restriction by the upper and lower limits of the recognition scores, for example, when a first-stage recognition candidate Xi having a recognition score greater than the upper limit (a recognition rate of 95%) is detected, the detected first-stage recognition result candidate Xi may be predicted to have a significantly low probability of being corrected and may automatically be set as a vocabulary word to be included in the designated dictionary without being output to the user. When a first-stage recognition result candidate Xi having a recognition score lower than the lower limit (a recognition rate of 40%) is detected, on the other hand, the detected first-stage recognition result candidate Xi may be predicted to have a high probability of having been incorrectly recognized and may automatically be removed from the vocabulary words to be included in the designated dictionary without being output to the user or without receipt of a correction utterance. In this case, only when a first-stage recognition result candidate Xi having a recognition score within the recognition rate range between 40% and 95% is detected is it determined that the detected first-stage recognition result candidate Xi may possibly be corrected and is selected as a presentation-target recognition result Xj. The user is then prompted for a correction utterance.

In the above-described example, two threshold values, i.e., the upper and lower limits, are used by way of example. Alternatively, either limit may be used as a threshold value, and a first-stage recognition result candidate Xi greater or lower than the threshold value may be selected as a presentation-target recognition result Xj. The first-stage recognition-result presenting unit 105 selects high-priority first-stage recognition result candidates Xi determined in the first method as presentation-target recognition results Xj and then presents information for acceptance of a correction using the presentation-target recognition results Xj.

2. Method Focusing on Combinations of Confusable Vocabulary Words

The second method focuses on combinations of confusable vocabulary words that may be erroneously recognized. That is, if keywords corresponding to such confusable vocabulary words are contained in the first-stage recognition result candidates Xi, high priority is assigned to the keywords, and the presentation-target recognition results Xj are determined based on the assigned priority. A combination of confusable vocabulary words is a combination of vocabulary words having similar acoustic features. For example, distributions of output probabilities to phoneme strings (sub-word strings) of all vocabulary words registered in acoustic models are taken into account, and the inter-distribution distance can be used as the similarity between vocabulary words. The similarity is also referred to as an "interphoneme distance."

The inter-distribution distance may be the Bhattacharyya distance or Kullback-Leibler (KL) distance, for example, or any other interphoneme distance also known to those in the art. All vocabulary entries registered in the first-stage dictionary are clustered based on combinations of acoustically similar vocabulary words according to the interphoneme distance, and the combinations of vocabulary words are stored, for example in a table. FIG. 6 shows an example of entries stored in the table. In some cases, a sequence of keywords may be acoustically similar to a different keyword. Therefore, such sequences can also be subjected to clustering and be included in the table. Referring to FIG. 6, for example, in Vocabulary-1, a combination of the word "IIN" (pronounced as /iin/) and the word "TOWER" (pronounced as /tawa-/) is registered in Cluster No. 2.

The first-stage recognition-result presenting unit 105 refers to the table in which the results of clustering are reflected. The first-stage recognition-result presenting unit 105 assigns high priority to a first-stage recognition result candidate Xi including any of the vocabulary words (or keywords) and selects the first-stage recognition result candidate Xi as a presentation-target recognition result Xj. If the presentation-target recognition result Xj is corrected, the similar vocabulary words are also presented to the user. According to this procedure, if a presentation-target recognition result Xj includes any of such confusable keywords, and if correction information for deleting the presentation-target recognition result Xj (e.g., "keyword=TOKYO and correction information=DELETE", etc.) is obtained, a message such as "Would you like to replace 'TOKYO' with 'TOKYU'?" is further presented to the user so that the user can easily correct the recognition error.

3. Method Focusing on Efficiency in Narrowing Down Second-Stage Dictionaries

In the third method, high priority is assigned to a vocabulary word among the first-stage recognition result candidates Xi that allows efficient narrowing down of the second-stage recognition targets when correction information is obtained. As described above, in the multi-stage recognition technique adopted in embodiments of the invention, the vocabulary entries included in the second-stage dictionary (second-stage recognition vocabulary entries) are associated with the vocabulary entries (keywords) included in the first-stage dictionary. For example, the vocabulary entry or keyword "TOKYO" in the first-stage dictionary is associated with a second-stage dictionary in which the second-stage recognition vocabulary entries "Tokyo Tower", "XXX Tokyo", etc., are stored. Since the data size of a second-stage dictionary corresponding to each keyword is known, the vocabulary size in the second-stage recognition process can be controlled to some extent by selection of a vocabulary word to be corrected.

In view of this point, the first-stage recognition-result presenting unit 105 selects presentation-target recognition results Xj. For example, as shown in part (c) of FIG. 5, the keywords "1. PARK", "2. YACHT", "3. TOKYO", "4. TOKYU", "5. KYOTO" and "6. KOKO" are obtained as first-stage recognition result candidates Xi. In this example, for ease of illustration, it is assumed that those six keywords are obtained with an equivalent degree of confidence. FIG. 7 shows the correspondence between the obtained keywords and the sizes of second-stage dictionaries corresponding to the keywords. The presentation-target recognition results Xj are selected in, for example, two cases (A) and (B) below.

(A) Receipt of "Delete" as Correction Speech B

In the case where "Delete" is received as correction speech B, the recognition efficiency increases as the second-stage dictionary size relating to a vocabulary word to be deleted increases. Therefore, the first-stage recognition-result presenting unit 105 assigns high priority to a vocabulary word with a large second-stage dictionary size. For example, if the above-described six keywords are obtained, the first-stage recognition-result presenting unit 105 selects the three highest-priority vocabulary words, i.e., "KOKO (size 5645)", "TOKYO (size=2454)" and "KYOTO (size=2052)", as presentation-target recognition results Xj. Then, a message such as, "A facilities search including any of 'KOKO', 'TOKYO', and 'KYOTO' is conducted. Please say an item to be deleted, if any," is output to the user. As a result, if "'KOKO' should be deleted" is acquired as the correction speech B from the user, the dictionary corresponding to the vocabulary word 'KOKO' can be removed from the second-stage recognition target, thus increasing the second-stage recognition efficiency.

(B) Receipt of "Set" as Correction Speech B

In the case where "set" is received as correction speech B, conversely to the deletion case, the recognition efficiency increases as the second-stage dictionary size relating to a vocabulary word to be set decreases. Therefore, the first-stage recognition-result presenting unit 105 assigns high priority to a vocabulary word with a small second-stage dictionary size. For example, if the above-described six keywords are obtained, the first-stage recognition-result presenting unit 105 selects the three highest-priority vocabulary words, i.e., "PARK (size=1341)", "YACHT (size=164)" and "TOKYU (size=204)", as presentation-target recognition results Xj. Then, a message such as, "A facilities search including any of 'PARK', 'YACHT', and 'TOKYU' is conducted" is output to the user. As a result, if "'PARK' should be set," is obtained as the correction speech B from the user, the second-stage recognition target can be limited to the dictionary corresponding to the vocabulary word "PARK", thus increasing the efficiency.

Both "delete" and "set" may be accepted as correction speech B. In this case, the first-stage recognition-result presenting unit 105 may select and present one vocabulary word with a large second-stage dictionary size and one vocabulary word with a small second-stage dictionary size as presentation-target recognition results Xj.

4. Method for Resolving Conflict Between First-Stage Recognition Candidates

The fourth method is a presentation method focusing on the conflict between first-stage recognition candidates. As described above, in the multi-stage recognition technique, a second-stage dictionary is selected based on a first-stage recognition result. Therefore, in all vocabulary entries of possible second-stage dictionaries, there may be a plurality of keywords with a lower probability of appearing within the same entry or with no probability of appearing within the same entry. If two keywords that are both closely related to the types of facilities, such as "GOLF" and "KOKO", are detected as first-stage recognition candidates, the possibility that at least one of them has been erroneously recognized is high because no facility names including both keywords exist. The same applies to the case where keywords both closely related to region names, such as "FUKUSHIMA" and "TOKUSHIMA", are detected.

The probability of appearance within the same entry can be determined by analyzing all possible vocabulary entries in advance. It is to be noted that there are some exceptions. Examples of such exceptional facility names within which a plurality of competitive keywords appear include, by example, "XXX Kencho Mae Eki" (which is a proper noun, meaning 'XXX-Prefectural-Government-Office Station', where "kencho" is normally translated as "prefectural government office", "mae" as "near" and "eki" as "station" (keyword="kencho"+"eki"), "Kanagawa Ginko Tokyo XXX Shiten (Kanagawa Bank's Tokyo XXX branch)" (keyword="kanagawa"+"tokyo"), and "Tokyo-to XXX" (keyword="tokyo"+"kyoto")

When the vocabulary words such as "GOLF" and "KOKO" with a low probability of appearing within the same phrase are detected at the same time, the first-stage recognition-result presenting unit 105 assigns high priority to the detected vocabulary words and selects them as presentation-target recognition results Xj. Then, a message such as, "A facilities search including 'GOLF' and 'KOKO' is conducted" or "Which keyword would you like to use to search for a facility, 'GOLF' or 'KOKO'?" is output to the user to prompt the user for an input of the correction speech B, e.g., "Set" or "Delete."

Even in such exceptional examples of names of facilities within which competitive keywords appear, it is possible to prompt the user for an input of correction speech B focusing on the meanings of the competitive keywords. For example, if the keywords "TOKYO" and "KYOTO" are detected in the utterance "Tokyo-to XXX", a message focusing on the meanings of the competitive keywords, such as "Which keyword would you like to use to search for a facility, Tokyo or Kyoto?", is output rather than a message focusing on the sequence of phonemes, such as "Would you like to search for a facility whose name includes 'TOKYO' and 'KYOTO'?". If the keyword "KYOTO" is deleted, dictionaries are changed so that the entries associated only with the keyword "KYOTO" are removed from the second-stage recognition vocabulary. Therefore, though facility names with "Tokyo-to" include the sequence of phonemes /kyo to/, for example, they are not removed but are left in the recognition target.

The first to fourth methods described above may be used solely, or may be used in combination to more efficiently obtain correction information. With the use of those methods, dictionaries are changed on the basis of a first-stage recognition result to effectively narrow down the vocabulary entries to be recognized in the second-stage recognition process. Therefore, the calculation resources required for re-recognition can be eliminated, and erroneous recognition in the second-stage recognition process caused by erroneous recognition in the first-stage recognition process can be reduced, resulting in an improvement of the recognition performance.

According to the first embodiment described above, the following advantages can be achieved.

First, keywords (first-stage recognition result candidates Xi) included in uttered speech A are recognized in the first-stage recognition process, and presentation-target recognition results Xj selected from among the first-stage recognition result candidates Xi are presented to a user. When a correction for the presentation-target recognition results Xj made by the user is received, the uttered speech A is recognized using a second-stage dictionary generated based on the result of the correction. Therefore, even if an error is contained in a result of keyword recognition, the error can be corrected and uttered speech can accurately be recognized.

Second, a correction for the presentation-target recognition results Xj input by the user by voice is received. Therefore, the user can easily correct the presentation-target recognition results Xj.

Third, a keyword having a recognition score within a predetermined range is extracted from among first-stage recognition result candidates Xi recognized in the first-stage recognition process and is selected as a presentation-target recognition result Xj. Therefore, a clearly erroneously recognized keyword may not be presented to the user; instead, a presentation-target recognition result Xj from which a keyword that is clearly erroneously recognized is removed can be presented to the user to allow the user to easily select an item to be corrected.

Fourth, keywords having similar acoustic features are extracted from among first-stage recognition result candidates Xi recognized in the first-stage recognition process and are selected as presentation-target recognition results Xj.

Therefore, presentation-target recognition results Xj that may be erroneously recognized by the system can be presented to the user to allow the user to easily select an item to be corrected.

Fifth, a keyword with a reduced second-stage-dictionary data size is extracted from among first-stage recognition result candidates Xi recognized in the first-stage recognition process and is selected as a presentation-target recognition result Xj. Therefore, the size of second-stage dictionary data can be reduced to reduce the system load during the second-stage recognition process.

Sixth, recognized keywords with a low probability of appearing within the same vocabulary entry to be recognized are preferentially extracted from among first-stage recognition result candidates Xi recognized in the first-stage recognition process and are selected as presentation-target recognition results Xj. Therefore, keywords that could have been erroneously recognized can be presented to the user to allow the user to select an item to be corrected.

In the first embodiment described above, a recognition result obtained by performing the first-stage recognition process is presented to the user, and the second-stage recognition process is performed after the completion of acceptance of a correction for the first-stage recognition result made by the user, by way of example. In a second embodiment of the invention, the second-stage recognition process is started immediately after the completion of the first-stage recognition process, and a correction for the first-stage recognition result made by the user is accepted during the second-stage recognition process or after the completion of the second-stage recognition process. The second embodiment also employs the structure shown in FIG. 1 and the processing flow shown in FIGS. 3A and 3B described above in the first embodiment, which are thus not described again.

Figure 8:
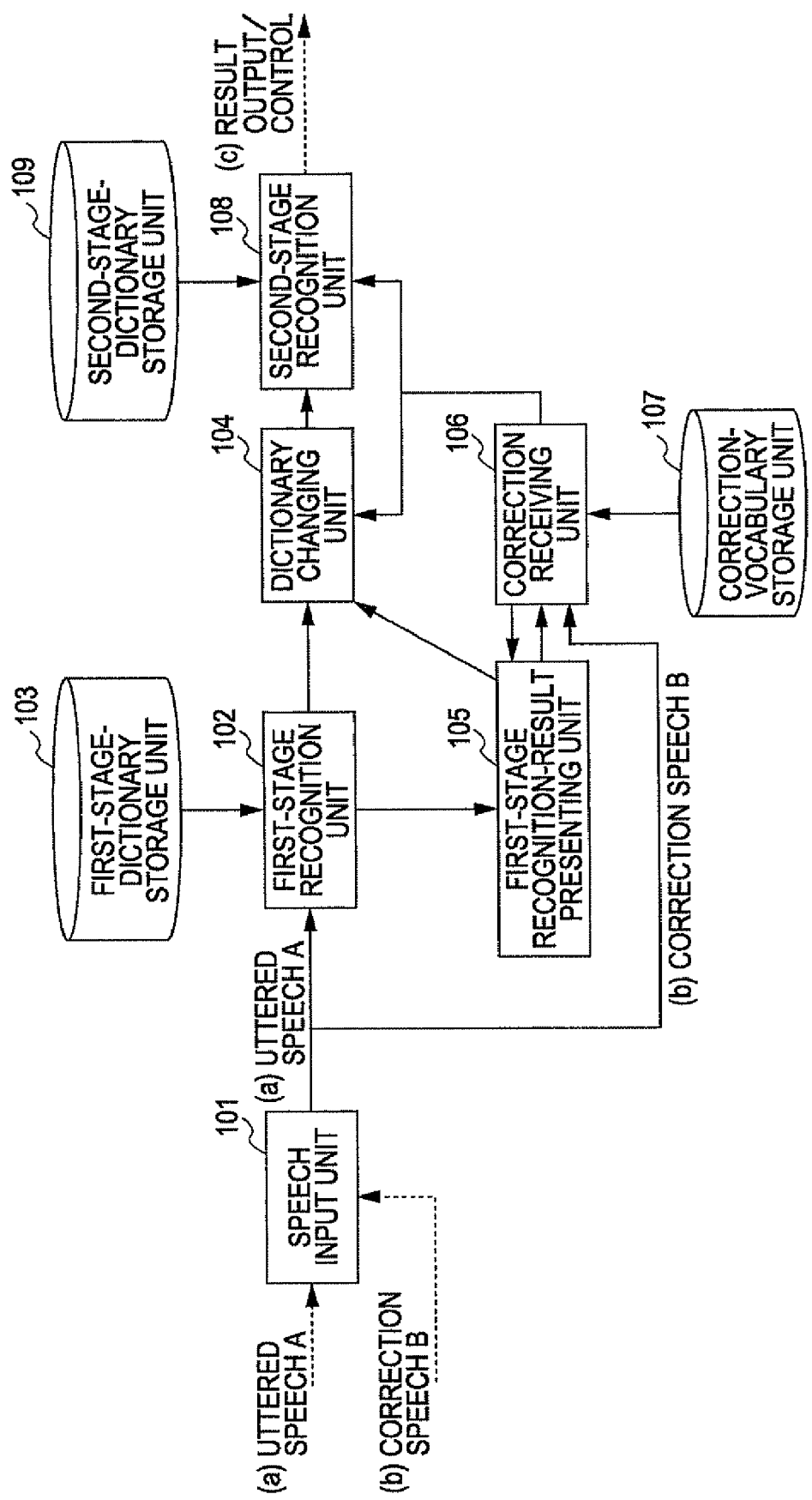
FIG. 8 is a block diagram showing a structure of an aspect of a speech recognition apparatus according to a second embodiment of the invention.

FIG. 8 is a block diagram showing a structure of an aspect of a speech recognition apparatus 100' according to the second embodiment. In FIG. 8, the same elements as those in the first embodiment described with reference to FIG. 2 are given the same reference numerals, and differences therebetween are mainly described. The first-stage recognition-result presenting unit 105 outputs the selected presentation-target recognition results Xj to the dictionary changing unit 104 and the correction receiving unit 106. The correction receiving unit 106 generates correction information and outputs the generated correction information to the dictionary changing unit 104, the first-stage recognition-result presenting unit 105 and the second-stage recognition unit 108.

The flow of a process of the speech recognition apparatus 100' according to the second embodiment is now described with reference to FIGS. 9 and 10. In a flowchart shown in FIG. 9, a second-stage recognition process based on a first-stage recognition result is shown in steps S205 to S207, and a process for changing the presentation-target recognition results Xj and the second-stage recognition result based on the correction utterance (correction reception and recognition-result modification process) is shown in steps S208 to S213. Both processes can be performed independently from each other, which is a feature of the second embodiment. FIG. 10 shows the relationship between user utterances and system responses according to the flowchart shown in FIG. 9. In FIG. 10, parts (a) to (k) show transactions between the system and the user and the flow of the first-stage recognition process and correction recognition process, and parts (l) to (p) show the flow of the second-stage recognition process.

In step S201, as shown in part (a) of FIG. 10, the first-stage recognition unit 102 loads a first-stage dictionary from the first-stage-dictionary storage unit 103. Then, the process proceeds to step S202, in which the first-stage recognition unit 102 acquires a speech utterance A input by the user via the speech input unit 101. For example, as shown in part (b) of FIG. 10, speech data of "Park Hyatt Tokyo" uttered by the user is acquired as the speech utterance A. Then, the process proceeds to step S203.

In step S203 the first-stage recognition unit 102 performs first-stage recognition using the first-stage dictionary and acquires n first-stage recognition result candidates Xi (i=1 to n). For example, as shown in part (c) of FIG. 10, six recognized keyword candidates "PARK", "YACHT", "TOKYO", "TOKYU", "KYOTO" and "KOKO" are acquired as the first-stage recognition result candidates Xi. The first-stage recognition unit 102 outputs the acquired first-stage recognition result candidates Xi to the dictionary changing unit 104 and the first-stage recognition-result presenting unit 105. Then, the process proceeds to step S204.

In step S204 the first-stage recognition-result presenting unit 105 selects keywords to be presented to the user, i.e., presentation-target recognition results Xj (where j denotes the index of a recognition result to be presented), from among the first-stage recognition result candidates Xi acquired by the first-stage recognition unit 102. The first-stage recognition-result presenting unit 105 assigns priority to the first-stage recognition result candidates Xi in a manner similar to that in the first embodiment to select the presentation-target recognition results Xj. For example, as shown in part (d) of FIG. 10, three keywords "1. PARK", "2. YACHT" and "3. TOKYO" are selected as the presentation-target recognition results Xj. The first-stage recognition-result presenting unit 105 outputs the selected presentation-target recognition results Xj to the dictionary changing unit 104 and the correction receiving unit 106.

Then, the process proceeds to the second-stage recognition process in steps S205 to S207 and the correction reception and recognition-result modification process in steps S208 to S213. First, the second-stage recognition process in steps S205 to S207 are described.

In step S205 the dictionary changing unit 104 sequentially loads the presentation-target recognition results Xj input from the first-stage recognition-result presenting unit 105 and loads the second-stage dictionaries corresponding to the presentation-target recognition results Xj from the second-stage-dictionary storage unit 109 to change between second-stage dictionaries. The second-stage recognition unit 108 loads the second-stage dictionaries. Then, the process proceeds to step S206. In step S206 the second-stage recognition unit 108 performs second-stage recognition on the speech utterance A acquired in step S202 using the loaded second-stage dictionaries.

Specifically, if "setting" information is obtained, the recognition is performed. In contrast, if "deletion" information is obtained, no second-stage recognition is performed on a keyword to be deleted. Alternatively, in either case, second-stage recognition may be performed, and the correction information may be reflected in a recognition-result synthesis process described below. For example, as shown in parts (l) to (o) of FIG. 10, recognition of each of the presentation-target recognition results Xj is performed, and a recognition result based on the 'PARK' dictionary, a recognition result based on the 'YACHT' dictionary and a recognition result based on the 'TOKYO' dictionary are obtained. Then, the process proceeds to step S207.

In step S207, the second stage recognition unit 108 determines whether or not the second-stage recognition process has been completed for all the presentation-target recognition results Xj. If the second-stage recognition process has been completed, the process proceeds to step S214 as described below. If the second-stage recognition process has not been completed, the process returns to step S205, in which the second-stage recognition process is performed for the remaining presentation-target recognition results Xj.

Next, the correction reception and recognition-result modification process in steps S208 to S213 are described In step S208 the correction receiving unit 106 combines the input presentation-target recognition results Xj with the correction vocabulary words stored in the correction-vocabulary storage unit 107 to generate a correction recognition dictionary and loads the correction recognition dictionary (see part (e) of FIG. 10). As in the first embodiment, the correction speech B that may possibly be uttered by the user may include "delete" and/or "set." Therefore, the correction receiving unit 106 combines the keywords "PARK", "YACHT" and "TOKYO" selected as the presentation-target recognition results Xj and the correction vocabulary words "DELETE" and "SET" with the garbage model to generate a correction recognition dictionary. Then, the process proceeds to step S209.

In step S209 the first-stage recognition-result presenting unit 105 presents the presentation-target recognition results Xj to the user. For example, as shown in part (f) of FIG. 10, a system utterance such as "A facilities search including any of 'PARK', 'YACHT', and 'TOKYO' is in progress" is output. Then, the process proceeds to step S210, in which the correction receiving unit 106 determines whether or not the correction speech B has been input, i.e., whether or not the correction speech B has been acquired. If the correction speech B has been input, the process proceeds to step S211.

In step S211 the correction receiving unit 106 performs speech recognition on the correction speech B using the correction recognition dictionary and generates and obtains correction information Xj'. For example, as shown in part (g) of FIG. 10, if the user utters "'YACHT' should be deleted" as the correction speech B, as in the first embodiment, the correction receiving unit 106 generates correction information Xj'"keyword=YACHT and correction type=DELETE" based on the recognition result "YACHT—(garbage)—DELETE". The correction receiving unit 106 outputs the generated correction information to the dictionary changing unit 104, the first-stage recognition-result presenting unit 105 and the second-stage recognition unit 108. Then, the process proceeds to step S212.

In step S212 the second-stage recognition unit 108 determines whether or not the second-stage recognition of a presentation-target recognition result Xj to be corrected by the input correction information Xj' has been completed. If the second-stage recognition of the presentation-target recognition result Xj to be corrected has not been completed, the process returns to step S204, in which the first-stage recognition-result presenting unit 105 modifies the presentation-target recognition results Xj so as to reflect the input correction information Xj'. For example, when "keyword=YACHT and correction type=DELETE" is input as the correction information Xj', as shown in part (h) of FIG. 10, the first-stage recognition-result presenting unit 105 deletes "2. YACHT" from the presentation-target recognition results Xj and generates new presentation-target recognition results Xj.

In step S209 the first-stage recognition-result presenting unit 105 presents the presentation-target recognition results Xj after the deletion to the user again. For example, as shown in part (i) of FIG. 10, a message "A facilities search including 'PARK' and 'TOKYO' is in progress" is presented to the user again.

If the second-stage recognition of the presentation-target recognition result Xj has been completed, the process proceeds to step S213. In step S213 the second-stage recognition unit 108 modifies the second-stage recognition results using the input correction information Xj'. Specifically, when "setting" information is input as the correction information Xj', e.g., when the speech "'PARK' should be set" is input, a bonus is added to the recognition score of a second-stage recognition result corresponding to the keyword to be set so that the priority order of the recognition result increases. If "deletion" information, e.g., "keyword=YACHT and correction type=DELETE", is input as the correction information Xj', a penalty is added to the recognition score of a second-stage recognition result corresponding to the keyword to be deleted so that the priority order of the recognition result decreases.

An example in the case where "keyword=YACHT and correction type=DELETE" is input as the correction information Xj' is shown in part (p) of FIG. 10. In this example, the second-stage recognition unit 108 adds a penalty (indicated by cross (x)) to the recognition result ('YACHT' dictionary) corresponding to the keyword "YACHT" among the second-stage recognition results corresponding to the presentation-target recognition results Xj, i.e., "PARK", "YACHT" and "TOKYO". Then, the process proceeds to step S207 described above. If it is determined that the second-stage recognition process has been completed for all the presentation-target recognition results Xj, the process proceeds to step S214.

In step S214 the second-stage recognition unit 108 integrates the second-stage recognition results corresponding to all the presentation-target recognition results Xj to acquire a final recognition result. That is, the second-stage recognition unit 108 reorganizes the recognition results obtained from the second-stage dictionaries and generates an interpretation, which is the final recognition result. For example, as shown in part (p) of FIG. 10, the second-stage recognition result corresponding to the presentation-target recognition result Xj "PARK" (recognition results based on the "PARK" dictionary) and the second-stage recognition result corresponding to the presentation-target recognition result Xj "TOKYO" (recognition results based on the "TOKYO" dictionary) are obtained. Those recognition results are integrated to generate an interpretation. For example, as shown in part (j) of FIG. 10, "Park Hyatt Tokyo" is generated as the interpretation. Then, the process ends.

The speech recognition apparatus 100' can be used in a navigation system. As shown in part (k) of FIG. 10, in the navigation system the destination spoken by the user is specified based on the interpretation generated by the second-stage recognition unit 108. Voice guidance relating to the setting of the destination and route calculation to the destination is performed.

According to the second embodiment described above, in addition to the advantages of the first embodiment the following advantages can be achieved. That is, in the multi-stage recognition technique in which dictionaries are changed based on a first-stage recognition result and re-recognition is performed using a second-stage dictionary, a correction for the first-stage recognition result can be received during the second-stage recognition process. Therefore, if the second-stage recognition of an item to be corrected has not been completed at the time when correction information is obtained, the vocabulary entries to be recognized in the second-stage recognition process can be narrowed down to reduce the calculation resources required for re-recognition. Further, if the second-stage recognition of the corresponding item has been completed, the correction information can appropriately be reflected in the recognition results, resulting in an improvement of the recognition performance.

The first and second embodiments have been described in the context of transactions between a system based on only speech (speech synthesis and speech recognition) and a user. In a third embodiment of the invention, a method that allows various types of correction using a combination of speech and display devices and switches is described. The third embodiment also employs the processing flow shown in FIGS. 3A and 3B described above in the first embodiment, and the process shown in FIG. 9 described above in the second embodiment, which are thus not described again.

Figure 11:
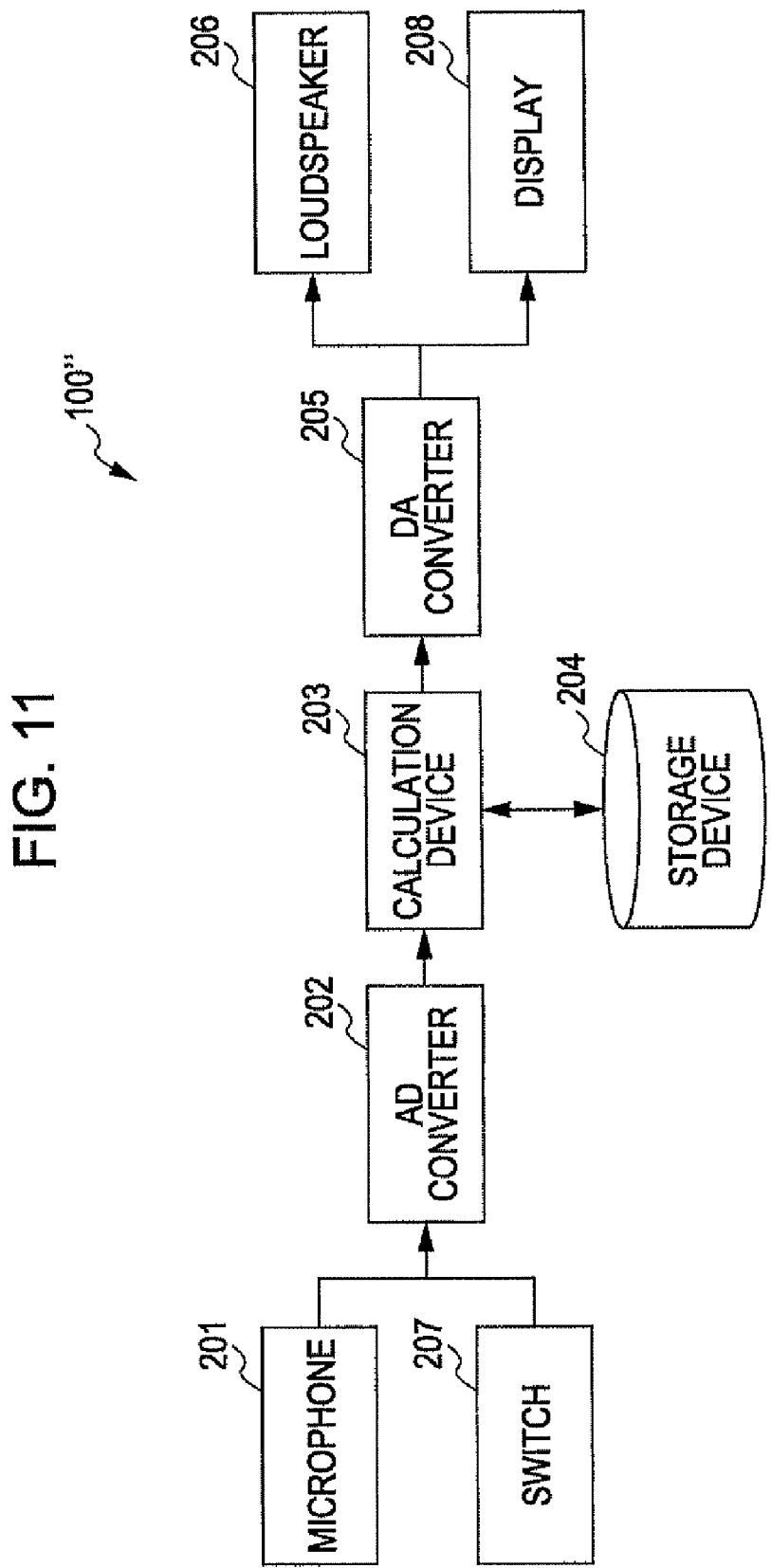
FIG. 11 is a diagram schematically showing a structure of an aspect of a speech recognition apparatus according to a third embodiment of the invention.

FIG. 11 is a diagram schematically showing a structure of an aspect of a speech recognition apparatus 100" according to the third embodiment. In FIG. 11, the same elements as those of the speech recognition apparatus 100 shown in FIG. 1 are given the same reference numerals, and differences therebetween are mainly described. The speech recognition apparatus 100" includes a microphone 201, an AD converter 202, a calculation device 203, a storage device 204, a DA converter 205, a loudspeaker 206, a switch 207 and a display 208.

Figure 12:
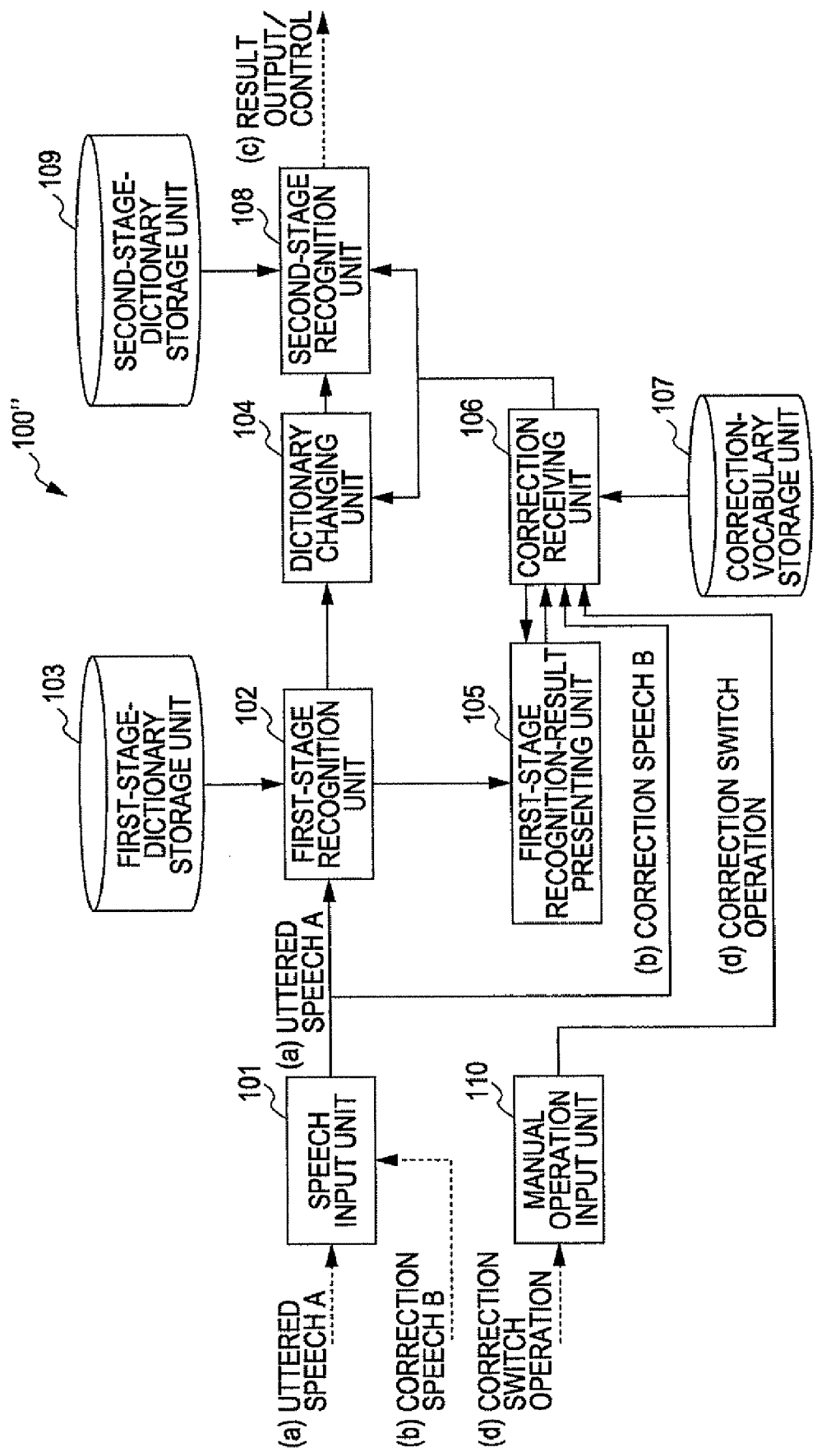
FIG. 12 is a block diagram showing a structure of another aspect of the speech recognition apparatus according to the third embodiment.

FIG. 12 is a block diagram showing a structure of another aspect of the speech recognition apparatus 100" according to the third embodiment. In FIG. 12, the same elements as those of the speech recognition apparatus 100 shown in FIG. 2 are given the same reference numerals and are described in correspondence with the devices shown in FIG. 11 in the context of the differences between the elements shown in FIGS. 2 and 12.

The speech recognition apparatus 100" further includes a manual operation input unit 110. The manual operation input unit 110 is implemented by a combination of the switch 207 and AD converter 202 shown in FIG. 11 and outputs an operation signal of the switch 207 operated by the user to correct a first-stage recognition result to the correction receiving unit 106. The correction made by operating the switch 207 is preferably performed in a manner similar to that of the correction made by voice described above in the first and second embodiments. Therefore, the user can select either a correction made by voice or a correction made by a switch operation. A correction method using the manual operation input unit 110 is described below.

The first-stage recognition-result presenting unit 105 is configured to present a first-stage recognition result to the user by voice and screen display and is implemented by a combination of the DA converter 205, loudspeaker 206 and display 208 shown in FIG. 11. That is, the first-stage recognition-result presenting unit 105 presents the presentation-target recognition results Xj by voice via the loudspeaker 206 in a manner similar to that described above in the first and second embodiments and also by screen display via the display 208. Therefore, the user can recognize the presentation-target recognition results Xj and the correction method through the screen in a more intuitive manner than by voice only.

The correction receiving unit 106 receives a signal of the correction speech B input by the user via the speech input unit 101 or a signal of the correction switch operation input via the manual operation input unit 110 and generates correction information. The generated correction information is output to the dictionary changing unit 104 and the second-stage recognition unit 108.

In FIG. 11, a touch panel may be mounted on the display 208 to integrate the switch 207 and the display 208. In the following description, the user operates the touch panel mounted on the display 208 to perform a correction switch operation.

In addition, the user can perform correction by voice instead of by operating the touch panel For example, instead of pressing a "delete" button associated with the word XXX, the user can say, "'XXX' should be deleted" to perform correction in a manner similar to that of the correction performed by operating the touch panel. It is to be noted that although a recognition rate of substantially 100% is achieved when the user operates the touch panel with his/her finger, a recognition error may occur during speech recognition when the user responds by voice.

Therefore, if a correction operation is manually performed, the input information is reliable to perform the correction operation. If a correction operation is performed by voice, however, the probability of a recognition error is taken into account and the correction operation is performed according to the degree of confidence. For example, when information regarding deletion is input by a manual operation, a keyword to be deleted is completely deleted. When the information is input by voice, on the other hand, it is necessary to take a measurement to avoid complete deletion if a recognition error occurs. For example, a calculation is performed with a penalty.

Figure 13:
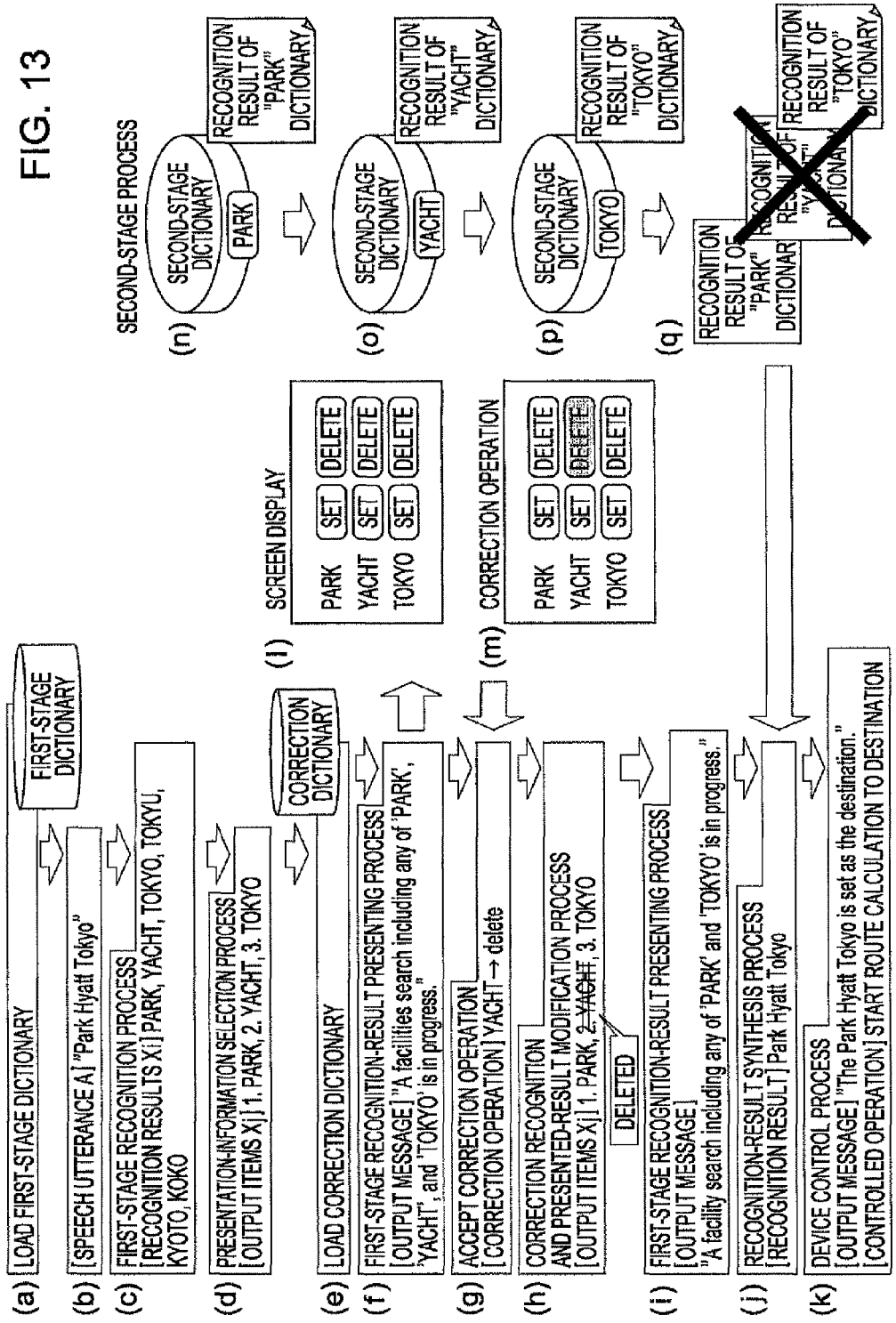
FIG. 13 is a diagram showing flow of a process of the speech recognition apparatus according to the third embodiment.

FIG. 13 shows the flow of a process according to the third embodiment. The content of an utterance A spoken by the user, the first-stage recognition result candidates Xi, the presentation-target recognition results Xj and the flow of the series of processing steps are similar to those shown in FIG. 10 described above in the second embodiment, and a description thereof is thus omitted. Features of the third embodiment, i.e., the presentation of the presentation-target recognition results Xj and correction reception using the switch 207 and display 208 are described in detail.

As shown in part (b) of FIG. 13, when a speech utterance A, "Park Hyatt Tokyo", is input by the user, the first-stage recognition unit 102 performs speech recognition and selects first-stage recognition result candidates Xi shown in part (c) of FIG. 13. Then, as shown in part (f) of FIG. 13, the first-stage recognition-result presenting unit 105 selects the presentation-target recognition results Xj and presents them to the user. The first-stage recognition-result presenting unit 105 outputs the presentation-target recognition results Xj by voice and also displays the presentation-target recognition results Xj on the screen in the manner shown in part (1) of FIG. 13.

Immediately after the above operation, the second-stage recognition unit 108 performs, as the background process, second-stage recognition using the second-stage dictionaries corresponding to the keywords "PARK", "YACHT" and "TOKYO". As shown in parts (n) to (p) of FIG. 13, the speech utterance A is re-recognized using the "PARK" dictionary, the "YACHT" dictionary and the "TOKYO" dictionary. Now, it is assumed that the user operates the touch panel and presses a "DELETE" button to delete the keyword "YACHT" displayed on the screen in the manner shown in part (m) of FIG. 13 during the second-stage recognition process. In this case, as shown in part (g) of FIG. 13, the correction receiving unit 106 receives correction for deleting the keyword "YACHT" from among the presentation-target recognition results Xj and generates correction information Xj' "keyword=YACHT and correction type=DELETE" in a manner similar to that in the first and second embodiments.

Figure 9:
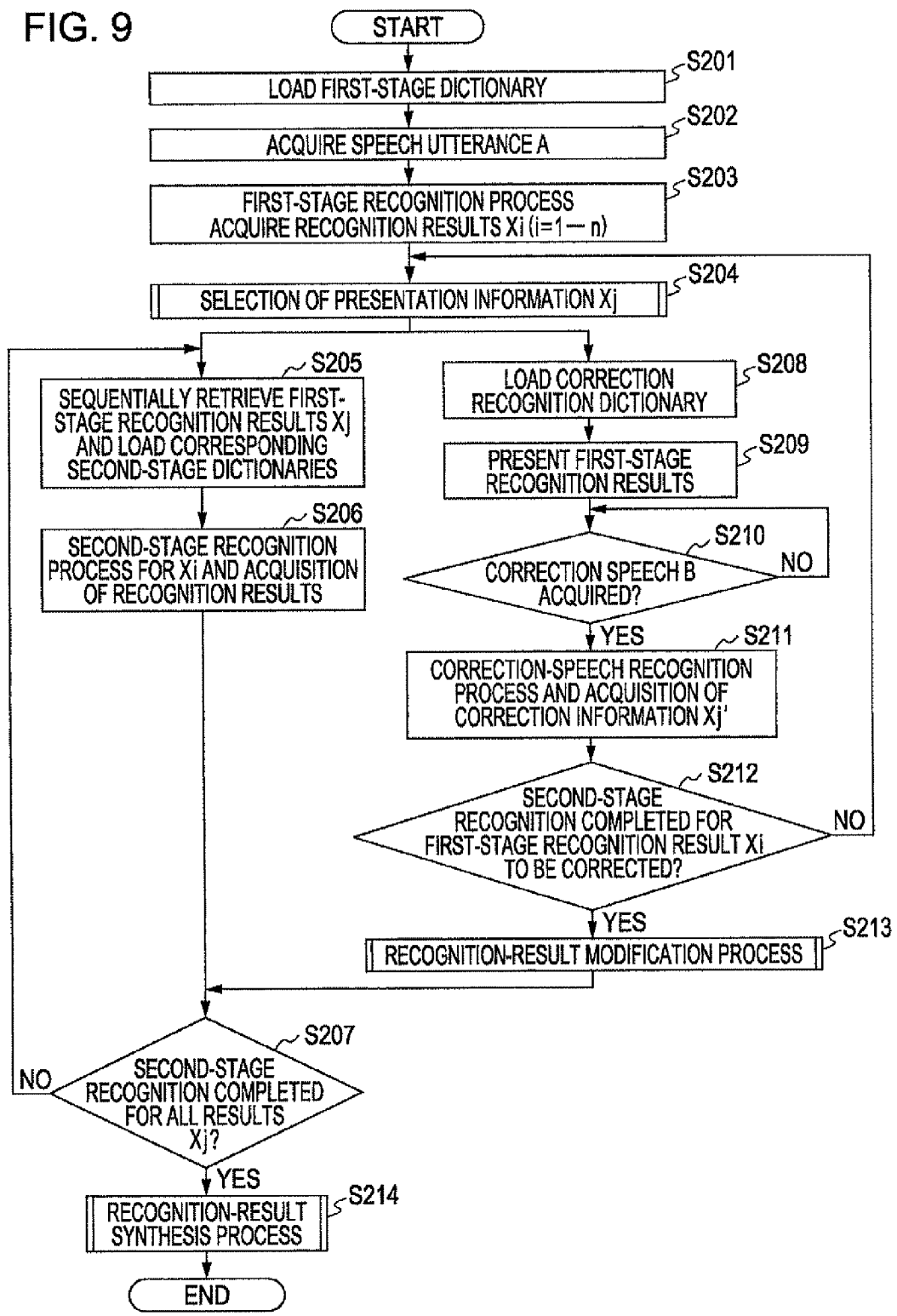
FIG. 9 is a flowchart showing a process of the speech recognition apparatus according to the second embodiment.
Figure 10:
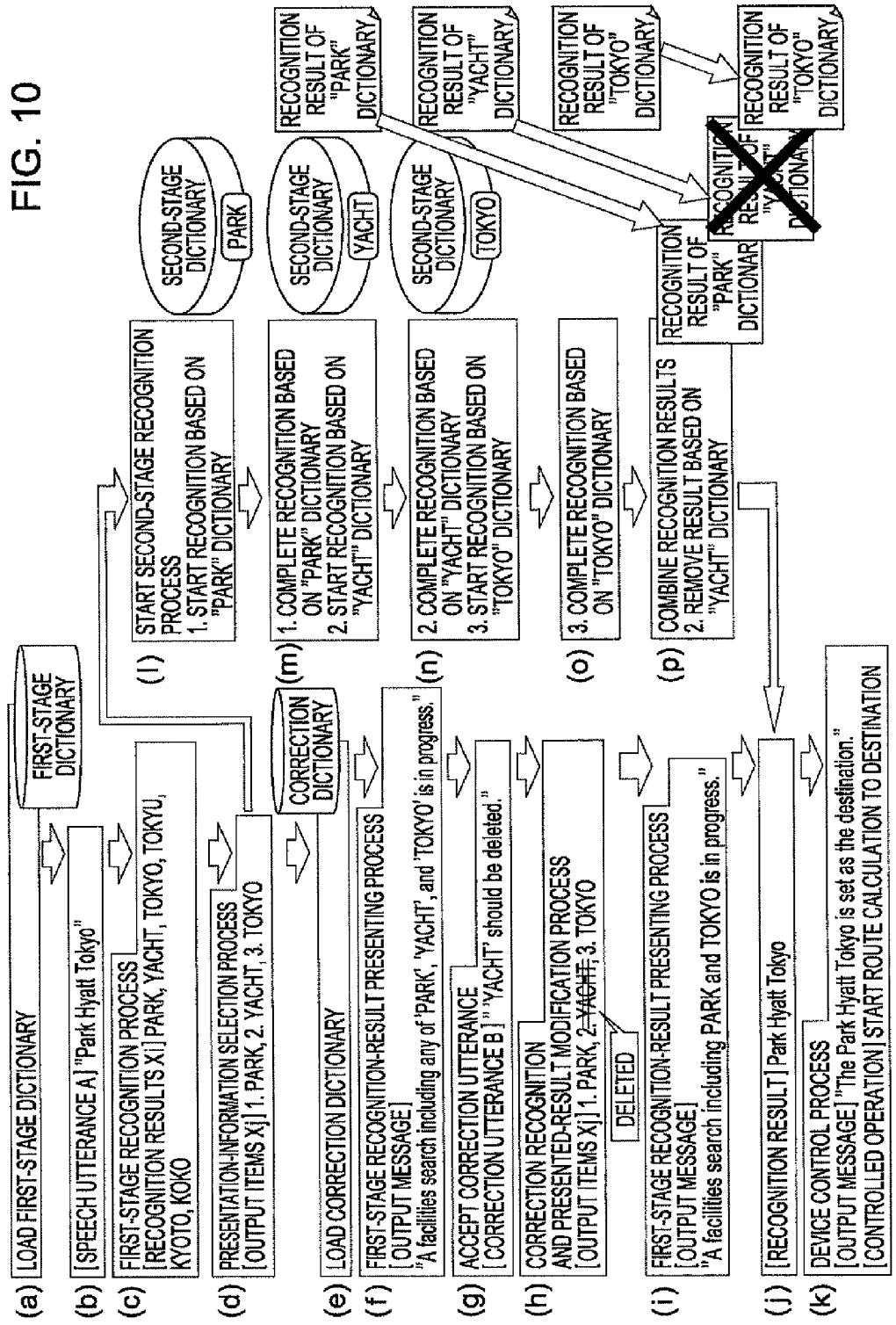
FIG. 10 is a diagram showing flow of the process of the speech recognition apparatus according to the second embodiment.

Then, the correction receiving unit 106 performs processing similar to the processing of steps S212 and S213 shown in FIG. 9 and described above in the second embodiment to reflect the content of the correction. That is, if the second-stage recognition of the keyword "YACHT" has not been completed, the keyword "YACHT" is removed from the second-stage recognition target, and the second-stage recognition process for the keyword "YACHT" is deleted. If the second-stage recognition of the keyword "YACHT" has been completed, the recognition result corresponding to the keyword "YACHT" is deleted so that, as shown in part (q) of FIG. 13, the recognition result corresponding to the keyword "YACHT" is not included in the recognition results to be subjected to the recognition-result synthesis process. As a result of the series of operations, as shown in part (j) of FIG. 13, the second-stage recognition unit 108 generates "Park Hyatt Tokyo" as the interpretation.

The correction process using screen display and manual operation input is now described in detail with reference to FIGS. 14 to 18. In the example shown in FIGS. 14 to 18, the second-stage recognition of a corrected keyword has not been completed. However, even in the case where the second-stage recognition of the corrected keyword has been completed, a bonus or penalty may be added to recognition scores in the recognition-result synthesis process in a manner similar to that in the second embodiment.

In FIGS. 14 to 18, it is assumed that an utterance A spoken by the user is "Park Hyatt Tokyo", and the first-stage recognition unit 102 obtains six recognized keyword candidates "PARK", "YACHT", "TOKYO", "TOKYU", "KYOTO" and "KOKO" as the first-stage recognition result candidates Xi unless specifically defined otherwise. It is further assumed that the first-stage recognition-result presenting unit 105 selects the keywords "PARK", "YACHT" and "TOKYO" as the presentation-target recognition results Xj.

Figure 14:
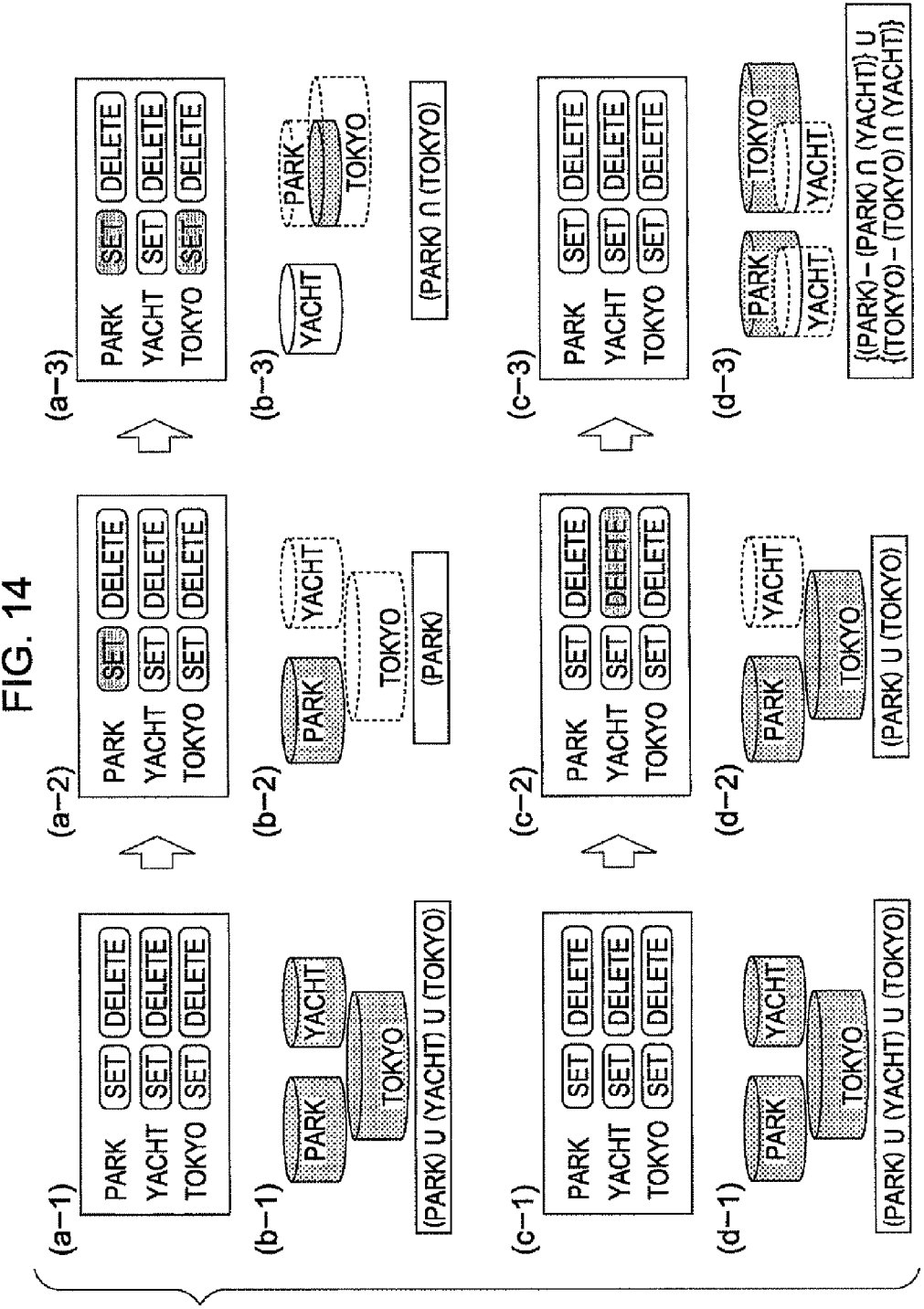
FIG. 14 is a diagram showing a first example of a correction process using screen display and manual operation input according to the third embodiment.

FIG. 14 is a diagram showing an example of transitions of screens and an example of changing of second-stage dictionaries in the case where the user operates the touch panel to "set" any of the presentation-target recognition results Xj and "delete" any of the presentation-target recognition results Xj. In FIG. 14, parts (a-1) to (a-3) show an example of transitions of screens in the setting operation, and parts (b-1) to (b-3) show the state of the second-stage dictionaries changed (result of a set operation) in accordance with the content of the operation performed on the screens in the setting operation. In FIG. 14, parts (c-1) to (c-3) show an example of transitions of screens in the deletion operation, and parts (d-1) to (d-3) show the state of the second-stage dictionaries changed (result of a deletion operation) in accordance with the content of the operation performed on the screens in the deletion operation.

First, the case where the setting operation is performed by the user is described. As shown in part (a-1) of FIG. 14, the first-stage recognition-result presenting unit 105 displays the presentation-target recognition results Xj, i.e., the three keywords "PARK", "YACHT" and "TOKYO", on the display 208 and displays "SET" and "DELETE" correction operation buttons ("SET" and "DELETE" buttons) in association with each of the keywords. As shown in part (b-1) of FIG. 14, the currently designated second-stage dictionary is the union (logical OR) of the dictionaries corresponding to the three keywords.

As shown in part (a-2) of FIG. 14, it is assumed that the user presses the "SET" button associated with the keyword "PARK" on the display 208 to set the keyword "PARK". In this case, as shown in part (b-2) of FIG. 14, the dictionary changing unit 104 removes the second-stage dictionaries other than the "PARK" dictionary and designates only the "PARK" dictionary as the second-stage dictionary.

Then, as shown in part (a-3) of FIG. 14, it is further assumed that the user presses the "SET" button associated with the keyword "TOKYO" on the display 208 to additionally set the keyword "TOKYO". In this case, as shown in part (b-3) of FIG. 14, the dictionary changing unit 104 extracts the common part of the "PARK" and "TOKYO" dictionaries and designates the extracted part as the second-stage dictionary. That is, vocabulary entries including both the keywords "PARK" and "TOKYO" are extracted from the "PARK" and "TOKYO" dictionaries to dynamically generate a second-stage dictionary (PARK)∩(TOKYO). When the second-stage dictionary shown in part (b-3) of FIG. 14 is generated, the contained keywords can be associated with all the second-stage recognition vocabulary entries in advance, and vocabulary entries are selected according to the logical expression described above to dynamically generate a dictionary.

Next, the case where the deletion operation is performed by the user is described. As shown in part (c-1) of FIG. 14, the first-stage recognition-result presenting unit 105 displays the presentation-target recognition results Xj, i.e., the keywords "PARK", "YACHT" and "TOKYO", on the display 208 and displays "SET" and "DELETE" correction operation buttons ("SET" and "DELETE" buttons) in association with each of the keywords. As shown in part (d-1) of FIG. 14, the currently designated second-stage dictionary is the union (logical OR) of the dictionaries corresponding to the three keywords.

As shown in part (c-2) of FIG. 14, it is assumed that the user presses the "DELETE" button associated with the keyword "YACHT" on the display 208 to delete the keyword "YACHT". In this case, as shown in part (d-2) of FIG. 14, the dictionary changing unit 104 removes the "YACHT" dictionary. Then, as shown in part (d-3) of FIG. 14, the dictionary changing unit 104 dynamically generates a second-stage dictionary {(PARK)-(PARK)∩(YACHT)}∪{(TOKYO)-(TOKYO)∩(YACHT)} by removing vocabulary entries from the "PARK" and "TOKYO" dictionaries that satisfy (PARK)∩(YACHT), which include both the keywords "PARK" and "YACHT", and that satisfy (TOKYO)∩(YACHT), which include both the keywords "TOKYO" and "YACHT".

Figure 15:
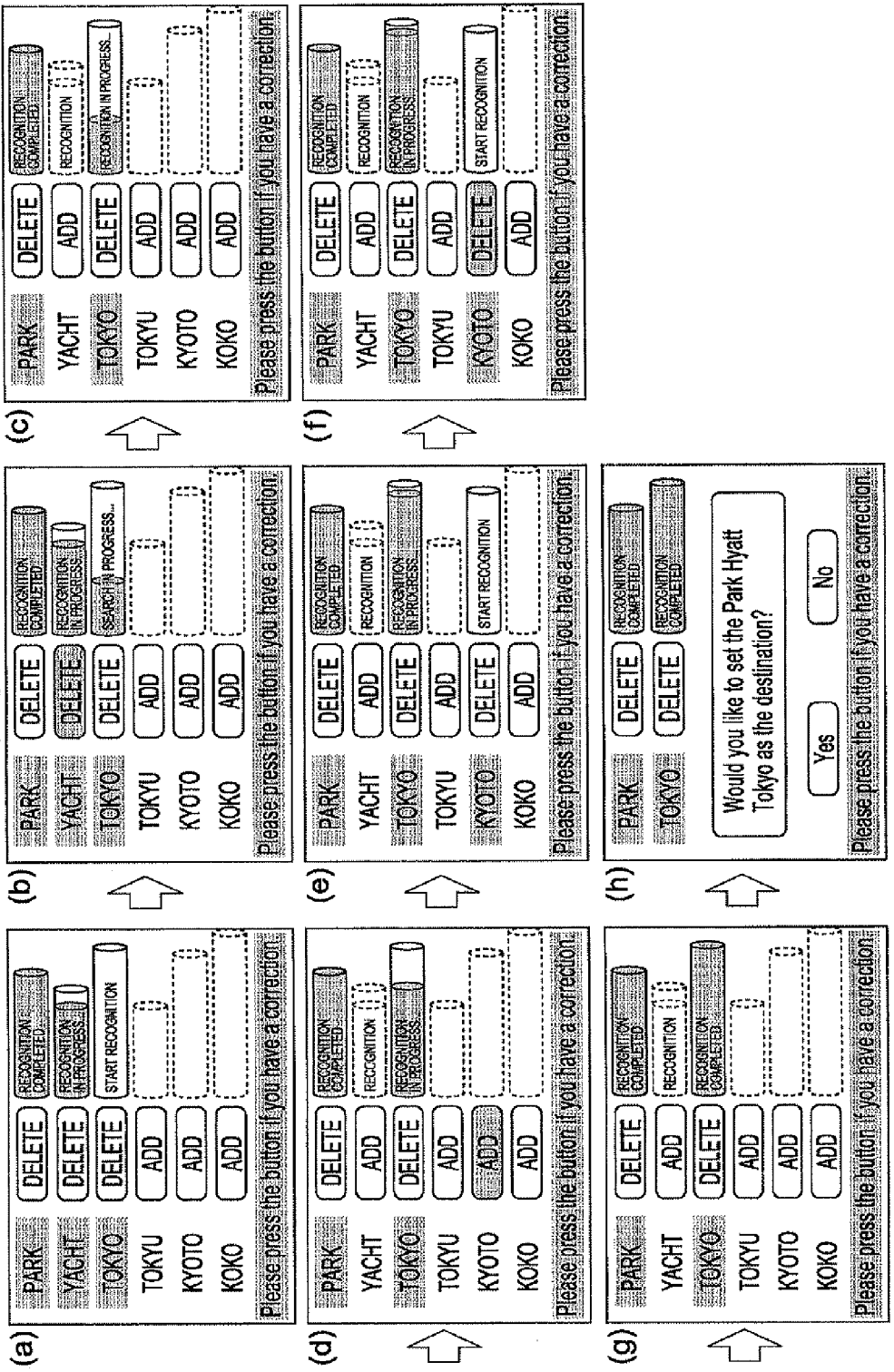
FIG. 15 is a diagram showing a second example of the correction process using screen display and manual operation input according to the third embodiment.

FIG. 15 shows an example of transitions of screens for receiving "deletion" and "addition" with respect to the presentation-target recognition results Xj. In the example shown in FIG. 15, as shown in part (a), the first-stage recognition-result presenting unit 105 displays all the first-stage recognition result candidates Xi on the display 208 and displays the presentation-target recognition results Xj in dark color to indicate items to be recognized in the second-stage recognition. The state of execution of the second-stage recognition process for the presentation-target recognition results Xj is classified into three categories. The first is "recognition completed" indicating that the second-stage recognition process has been completed. The second is "recognition in progress" indicating that the second-stage recognition process is in progress. The third is "start recognition" indicating that the second-stage recognition process is placed on standby.

On the other hand, the remaining three keywords that are not selected as the presentation-target recognition results Xj are displayed in light color to indicate that those keywords are items not to be recognized in the second-stage recognition. In part (a) of FIG. 15, the size (dictionary size) of the recognition-target dictionary and the remaining time (required time) required for the search are visually displayed to help the user understand the internal state of the system. That is, the dictionary size and the required time are represented by the length of cylinder icons to show the state of execution of the second-stage recognition process; the longer the cylinder icon, the larger the dictionary size and the longer the required time.

As shown in part (b) of FIG. 15, it is assumed that the user deletes the keyword "YACHT". In this case, the second-stage recognition unit 108 terminates the second-stage recognition process for the keyword "YACHT" to be deleted. Then, as shown in part (c) of FIG. 15, the first-stage recognition-result presenting unit 105 displays the keyword "YACHT" in light color to expressly indicate that the keyword "YACHT" is now an item not to be recognized in the second-stage recognition.

Then it is assumed that, as shown in part (d) of FIG. 15, the user presses the "ADD" button on the display 208 to add the keyword "KYOTO", which has not been selected as one of the presentation-target recognition results Xj, to the presentation-target recognition results Xj. In this case, as shown in part (e) of FIG. 15, the first-stage recognition-result presenting unit 105 displays the keyword "KYOTO" in dark color to expressly indicate that the keyword "KYOTO" is added to the presentation-target recognition results Xj and is now an item to be recognized in the second-stage recognition. The state of execution of the second-stage recognition process, dictionary size and required time, described above, for the keyword "KYOTO" are thus displayed on the display 208.

Then, as shown in part (f) of FIG. 15, the user deletes the keyword "KYOTO" to remove the keyword "KYOTO" from the second-stage recognition items as shown in part (g) of FIG. 15. Then, the second-stage recognition unit 108 performs second-stage recognition on the keywords "PARK" and "TOKYO", and, as shown in part (h) of FIG. 15, "Park Hyatt Tokyo" is generated as the interpretation.

Figure 16:
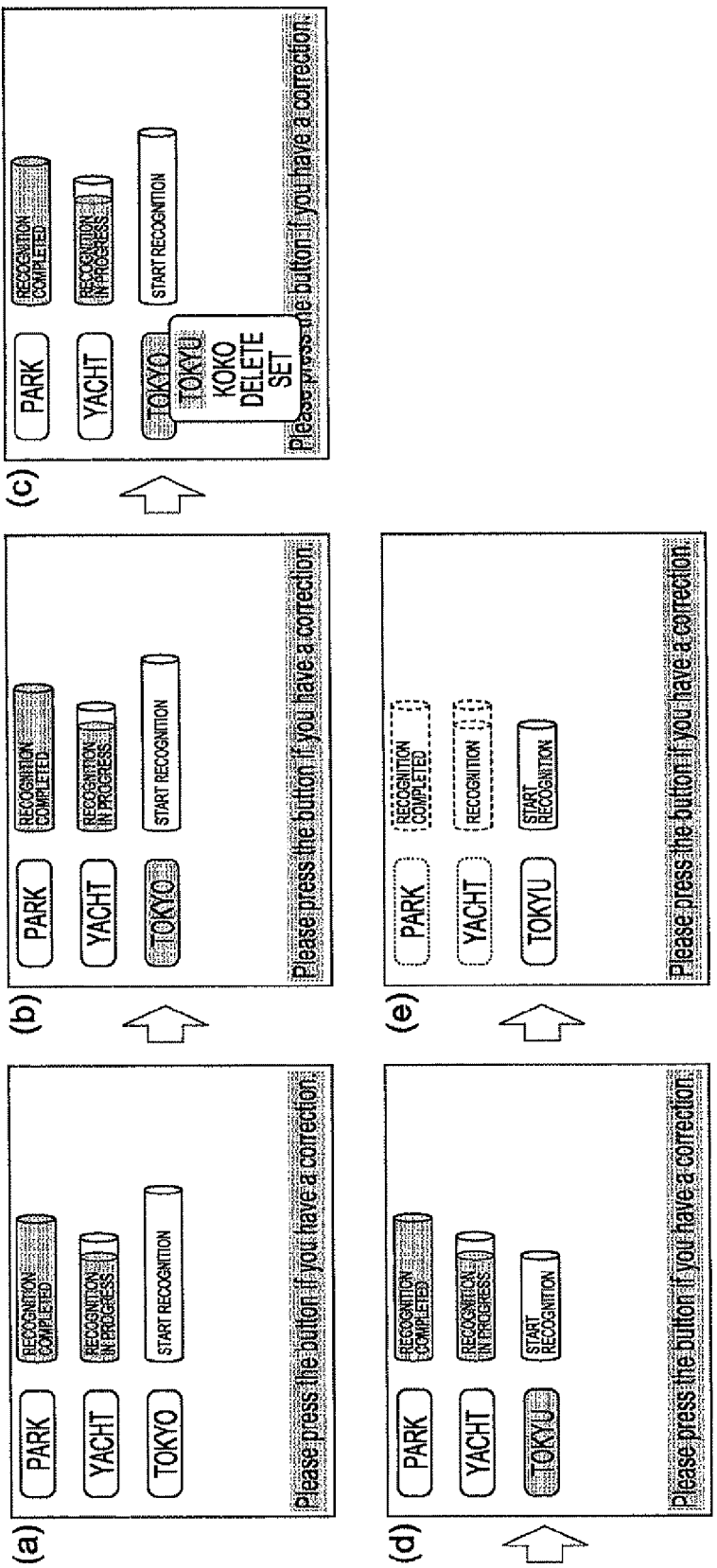
FIG. 16 is a diagram showing a third example of the correction process using screen display and manual operation input according to the third embodiment.

FIG. 16 is a diagram showing a method for correcting a keyword in the case of the occurrence of a recognition error in which one of the presentation-target recognition results Xj is replaced by another vocabulary word, i.e., a replacement error. Replaceable keywords can be determined using the interphoneme distance measure described above in the first embodiment. As shown in part (a) of FIG. 16, the first-stage recognition-result presenting unit 105 displays the presentation-target recognition results Xj on the display 208. As shown in part (b) of FIG. 16, when the user presses the "TOKYO" field on the screen, the first-stage recognition-result presenting unit 105 displays a list of keyword candidates "TOKYU" and "KOKO", as shown in part (c) of FIG. 16, which are acoustically similar to the keyword "TOKYO", from among the first-stage recognition result candidates Xi. "SET" and "DELETE" options for performing setting and deletion operations on the keyword "TOKYO" are also displayed.

When the user selects the option "TOKYU" in the list, as shown in part (d) of FIG. 16, the first-stage recognition-result presenting unit 105 adds the keyword "TOKYU" to the presentation-target recognition results Xj so as to newly include it in the second-stage recognition items. Then, the dictionary changing unit 104 changes the second-stage dictionary from the "TOKYO" dictionary to the "TOKYU" dictionary. Further, it can be determined that the user "sets" the keyword "TOKYU" by selecting the option "TOKYU" from the list, and the correction receiving unit 106 may generate setting information "TOKYU"+"SET". In this case, as shown in part (e) of FIG. 16, the first-stage recognition-result presenting unit 105 displays the keywords "PARK" and "YACHT" in light color, and the second-stage recognition unit 108 removes the corresponding recognition results from the second-stage recognition results.

Figure 17:
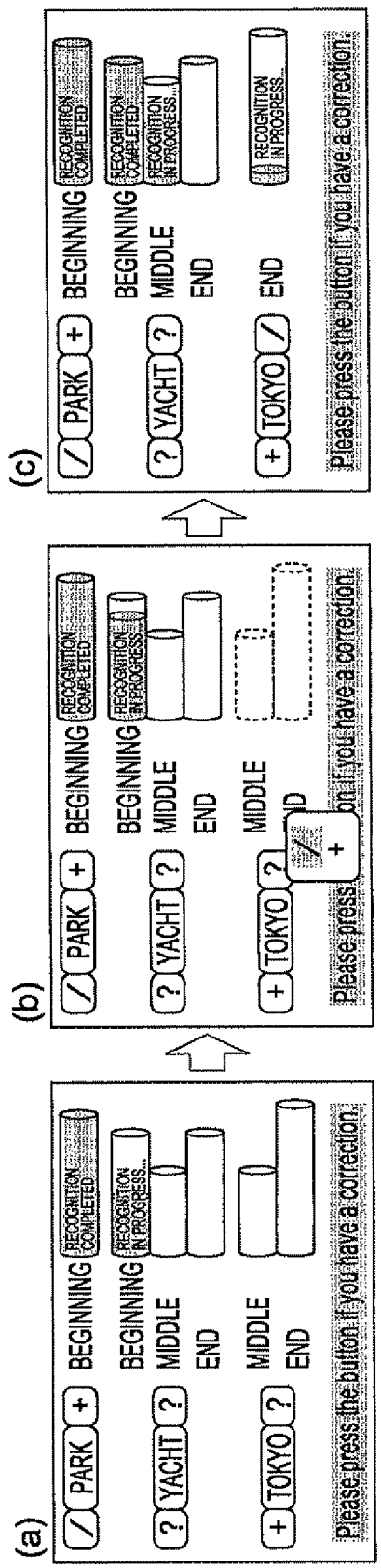
FIG. 17 is a diagram showing a fourth example of the correction process using screen display and manual operation input according to the third embodiment.

FIG. 17 is a diagram showing a correction method taking account of the appearance position of each of the presentation-target recognition results Xj within the speech utterance A, i.e., which of the "beginning", "middle" or "end" of the speech utterance A each of the presentation-target recognition results Xj is placed. In the example shown in FIG. 17, the second-stage dictionary corresponding to each of the presentation-target recognition results Xj (each of the keywords) is classified into the "beginning", "middle" and "end" dictionaries and stored.

As shown in part (a) of FIG. 17, the first-stage recognition-result presenting unit 105 displays the presentation-target recognition results Xj, i.e., the keywords "PARK", "YACHT" and "TOKYO", on the display 208 and attaches one of a plus (+) mark, a slash (/) mark and a question (?) mark before and after each of the presentation-target recognition results Xj to indicate the appearance position of each of the presentation-target recognition results Xj. In general, speech recognition apparatuses are designed to estimate the appearance position of each of the recognized presentation-target recognition results Xj. Therefore, in some cases, the position of each of the presentation-target recognition results Xj, i.e., the "beginning", "middle" or "end" of an utterance, can be specified in view of the relationship with the appearance positions of the other presentation-target recognition results Xj.

In this example, the plus mark attached before each of the presentation-target recognition results Xj indicates that a vocabulary word exists before the presentation-target recognition result Xj, and the plus mark attached after each of the presentation-target recognition results Xj indicates that a vocabulary word exists after the presentation-target recognition result Xj. The slash mark attached before each of the presentation-target recognition results Xj indicates that no vocabulary words exist before the presentation-target recognition result Xj, i.e., that the presentation-target recognition result Xj is positioned at the beginning of the utterance. Similarly, the slash mark attached after each of the presentation-target recognition results Xj indicates that no vocabulary words exist after the presentation-target recognition result Xj, i.e., that the presentation-target recognition result Xj is positioned at the end of the utterance. The question mark attached before and after each of the presentation-target recognition results Xj indicates that it is not known whether or not a vocabulary word exists before and after the presentation-target recognition result Xj.

In the example shown in part (a) of FIG. 17, the slash mark is attached before and the plus mark is attached after the keyword "PARK". Therefore, it can be determined that the keyword "PARK" is positioned at the "beginning" of an utterance. In this case, the dictionary changing unit 104 changes the second-stage dictionary corresponding to the keyword "PARK" to a beginning-type second-stage dictionary composed of recognition-target vocabulary entries including the keyword "PARK" at the beginning thereof. Then second-stage recognition unit 108 performs the second-stage recognition process using the beginning-type second-stage dictionary.

The question mark is attached before and after the keyword "YACHT", and therefore the position of the keyword "YACHT" cannot be determined. In this case, the dictionary changing unit 104 changes the second-stage dictionary corresponding to the keyword "YACHT" to all types of second-stage dictionaries, i.e., a beginning-type second-stage dictionary composed of recognition-target vocabulary entries including the keyword "YACHT" at the beginning thereof, a middle-type second-stage dictionary composed of recognition-target vocabulary entries including the keyword "YACHT" at the middle thereof and an end-type second-stage dictionary composed of recognition-target vocabulary entries including the keyword "YACHT" at the end thereof. The second-stage recognition unit 108 performs the second-stage recognition process using those second-stage dictionaries.

The plus mark is attached before and the question mark is attached after the keyword "TOKYO", and therefore it can be determined that the keyword "Tokyo" is positioned at the "middle" or "end" of an utterance. In this case, the dictionary changing unit 104 changes the second-stage dictionary corresponding to the keyword "TOKYO" to a middle-type second-stage dictionary compose of recognition-target vocabulary entries including the keyword "TOKYO" at the middle thereof and an end-type second-stage dictionary composed of recognition-target vocabulary entries including the keyword "TOKYO" at the end thereof The second-stage recognition unit 108 performs the second-stage recognition process using those second-stage dictionaries.

The user can select one of the plus, slash and question marks displayed on the display 208 to correct the displayed content. That is, the user can correct the appearance position of each of the presentation-target recognition results Xj. For example, as shown in part (b) of FIG. 17, the user presses the question mark displayed after the keyword "TOKYO" to display a list of the slash and plus marks as candidates that can be replaced. The user selectively presses a desired mark from among the listed slash and plus marks to correct the appearance position of the keyword "TOKYO". For example, as shown in part (c) of FIG. 17, the mark attached after the keyword "TOKYO" is corrected to the slash mark to correct the appearance position of the keyword "TOKYO" to the "end" of an utterance.

In this case, the dictionary changing unit 104 removes the middle-type second-stage dictionary from the second-stage dictionary corresponding to the keyword "TOKYO" and changes the second-stage dictionary to only the end-type second-stage dictionary. The second-stage recognition unit 108 performs the second-stage recognition process using the end-type second-stage dictionary.

FIG. 18 is a diagram showing a correction method for displaying the appearance position of each of the presentation-target recognition results Xj within the speech utterance A and receiving a correction in a manner similar to that described with reference to FIG. 17. The correction method shown in FIG. 18 is different in display style from that shown in FIG. 17 to allow the user to visually perceive the appearance positions with ease.

As shown in part (a-1) of FIG. 18, the first-stage recognition-result presenting unit 105 displays three keywords "PARK", "YACHT" and "TOKYO" in dark color as presentation-target recognition results Xj. The first-stage recognition-result presenting unit 105 also displays the first-stage recognition result candidates Xi other than the presentation-target recognition results Xj, i.e., three non-candidate keywords "TOKYU", "KYOTO" and "KOKO", in light color as modifiable candidates although those keywords are items not to be recognized in the second-stage recognition. The first-stage recognition-result presenting unit 105 displays the three non-candidate keywords at positions corresponding to the appearance positions thereof. For example, in the example shown in part (a-1) of FIG. 18, the appearance positions of the three non-candidate keywords are nearest the appearance position of the presentation-target recognition result Xj "TOKYO", and therefore the three non-candidate keywords are displayed in the vicinity of the keyword "TOKYO".

When the user specifies any of the second-stage recognition-target keywords displayed in dark color on the screen shown in part (a-1) of FIG. 18, the correction receiving unit 106 receives a deletion correction of the specified second-stage recognition-target keyword and changes the corresponding keyword to an item not to be recognized in the second-stage recognition. Conversely, when the user specifies any of the non-second-stage recognition keywords displayed in light color, the correction receiving unit 106 receives a setting correction of the specified non-second-stage recognition keyword and changes the corresponding keyword to an item to be recognized in the second-stage recognition.

For example, as shown in part (a-2) of FIG. 18, when the correction receiving unit 106 receives a deletion correction of the keyword "YACHT" in response to the pressing of the displayed field named "YACHT" by the user as shown in part (a-3) of FIG. 18, the second-stage recognition-result presenting unit 105 displays the keyword "YACHT" in light color to expressly indicate that the keyword "YACHT" is now an item not to be recognized in the second-stage recognition. The dictionary changing unit 104 removes the second-stage dictionary corresponding to the keyword "YACHT" and designates the second-stage dictionary corresponding to the keyword "PARK" and the second-stage dictionary corresponding to the keyword "TOKYO". The second-stage recognition unit 108 performs second-stage recognition using those second-stage dictionaries.

In another example, when the user utters "Yokohama Machida Inter" as the speech utterance A as shown in part (b-1) of FIG. 18, three keywords "YOKOHAMA", "HACHIMAN" and "IIN" are displayed as presentation-target recognition results Xj. Further, the keywords "YOKOSUKA", "HAMAMATSU", "TOWER", "INTER" and "CENTER" are displayed as non-candidate keywords at display positions corresponding to the appearance positions thereof.

As shown in part (b-2) of FIG. 18, when the user presses the displayed field named "HACHIMAN", the correction receiving unit 106 receives a deletion correction of the keyword "HACHIMAN". Then, as shown in part (b-3) of FIG. 18, the second-stage recognition-result presenting unit 105 displays the keyword "HACHIMAN" in light color to expressly indicate that the keyword "HACHIMAN" is now an item not to be recognized in the second-stage recognition. Further, as shown in part (b-4) of FIG. 18, when the user presses the displayed field named "INTER", which is a non-candidate keyword, the correction receiving unit 106 receives a setting correction of the keyword "INTER". Then, as shown in part (b-5) of FIG. 18, the second-stage recognition-result presenting unit 105 displays the keyword "INTER" in dark color to expressly indicate that the keyword "INTER" is now an item to be recognized in the second-stage recognition. Further, the second-stage recognition-result presenting unit 105 changes the keyword "IIN" recognized at the appearance position corresponding to that of the keyword "INTER" and selected as a presentation-target recognition result Xj to an item not to be recognized in the second-stage recognition and exchanges the display position of the keywords "IIN" and "INTER".

Then, the dictionary changing unit 104 removes second-stage dictionaries corresponding to the deleted keywords "HACHIMAN" and "IIN" and designates the second-stage dictionaries corresponding to the keywords "YOKOHAMA" and "INTER", which are items to be recognized in the second-stage recognition. The second-stage recognition unit 108 performs the second-stage recognition process using those second-stage dictionaries.

According to the third embodiment described above, in addition to the advantages of the first embodiment, the following advantages are achieved.

First, in a multi-stage recognition technique in which a second-stage dictionary is changed according to first-stage recognition results and re-recognition is performed using the second-stage dictionary, a first-stage recognition result obtained from an utterance spoken by the user can be efficiently corrected through display and switch operation and can be reflected in the second-stage recognition process. Therefore, the second-stage dictionary entries used in the second-stage recognition process can be efficiently narrowed down to reduce the calculation resources required for re-recognition. Further, correction information can be appropriately reflected in the first-stage recognition result, resulting in an improvement of the recognition performance.

Second, the dictionary changing unit 104 generates a second-stage dictionary as the union of recognition-target vocabulary entries including the presentation-target recognition results Xj that have been corrected. Therefore, the recognition-target vocabulary entries contained in the second-stage dictionary can be reduced to only necessary vocabulary entries to reduce the memory space. Further, the speech utterance A including the presentation-target recognition results Xj obtained as a result of correction can be accurately recognized.

Third, the correction receiving unit 106 receives "deletion" for removing an erroneously recognized keyword from among the presentation-target recognition results Xj to correct the presentation-target recognition results Xj or receives "addition" for adding another keyword included in first-stage recognition result candidates Xi to the presentation-target recognition results Xj to correct the presentation-target recognition results Xj. The dictionary changing unit 104 generates a second-stage dictionary based on the result of the "deletion" or "addition" correction. Therefore, a second-stage dictionary in which the result of correction made by the user is reflected is generated to perform high-accuracy second-stage recognition.

Fourth, the appearance positions of the presentation-target recognition results Xj within the speech utterance A are specified, and a second-stage dictionary in accordance with the appearance position of each of the presentation-target recognition results Xj is generated to perform second-stage recognition. Therefore, the accuracy of second-stage recognition can further be improved.

The first to third embodiments have been described in the context of speech recognition methods based on the "multi-stage recognition technique" in which a second-stage dictionary is changed according to a result of first-stage recognition to perform re-recognition, i.e., second-stage recognition. A fourth embodiment of the invention is described in the context of a speech recognition method based on a "complex speech search technique" in which a database (hereinafter referred to as a "DB") search query is generated based on a result of first-stage recognition, and a DB is searched using the search query to perform speech recognition. The fourth embodiment also employs the structure shown in FIG. 11 described above in the third embodiment which is thus not described again.

FIG. 19 is a block diagram showing a structure of an aspect of a speech recognition apparatus 100''' according to the fourth embodiment. In FIG. 19, the same elements as those of the speech recognition apparatus 100'' shown in FIG. 12 described in the third embodiment are given the same reference numerals, and differences therebetween are mainly described.

The first-stage-dictionary storage unit 103 stores a first-stage dictionary used for matching with a spoken utterance by the first-stage recognition unit 102, and as shown in FIG. 20 the first-stage dictionary is composed of garbage models and keywords. In the fourth embodiment, to specify target data using search queries based on keywords, preferably, keywords recorded in the first-stage dictionary are selected so that all data in the DB can be uniquely determined by a single keyword or a combination of a plurality of keywords. Specifically, for example, all morphemes included in all data may be extracted and recorded as keywords, or a predetermined number of morphemes with a high frequency of occurrence may be extracted and recorded as keywords while the remaining data (e.g., names of facilities) may be recorded as keywords.

A search query generation unit 111 extracts one or more high-priority keywords as presentation-target keywords from among the presentation-target recognition results Xj selected by the first-stage recognition unit 102 and generates search queries using the extracted presentation-target keywords. If a plurality of presentation-target keywords is extracted, the search queries are generated so as to cover all combinations thereof. The details are described below.

A DB search unit 112 performs keyword searches on database entries stored in a DB 113 using the search queries generated by the search query generation unit 111 to search for a keyword stored in the database entries and perform scoring of the keyword. The keyword search and scoring are described below.

The DB 113 stores database entries to be searched by the DB search unit 112. FIG. 21 shows an example of data stored in the DB 113. The database shown in FIG. 21 contains data of prefectures, cities/wards/towns/villages, names of facilities and the Japanese pronunciation of the names of facilities. In the keyword search process performed by the DB search unit 112, keyword search and scoring based on the search queries obtained from the search query generation unit 111 are performed on the "pronunciation of name of facility" data.

The flow of a process of the speech recognition apparatus 100''' according to the fourth embodiment is described with reference to FIGS. 22 and 23. In a flowchart shown in FIG. 22, a DB search process based on a first-stage recognition result is shown in steps S305 to S307, and a process for changing the presentation-target recognition results Xj and the second-stage recognition results based on a correction utterance or correction operation is shown in steps S308 to S313. Both processes are performed independently from each other in a manner similar to that described above in the second embodiment.

Figure 22:
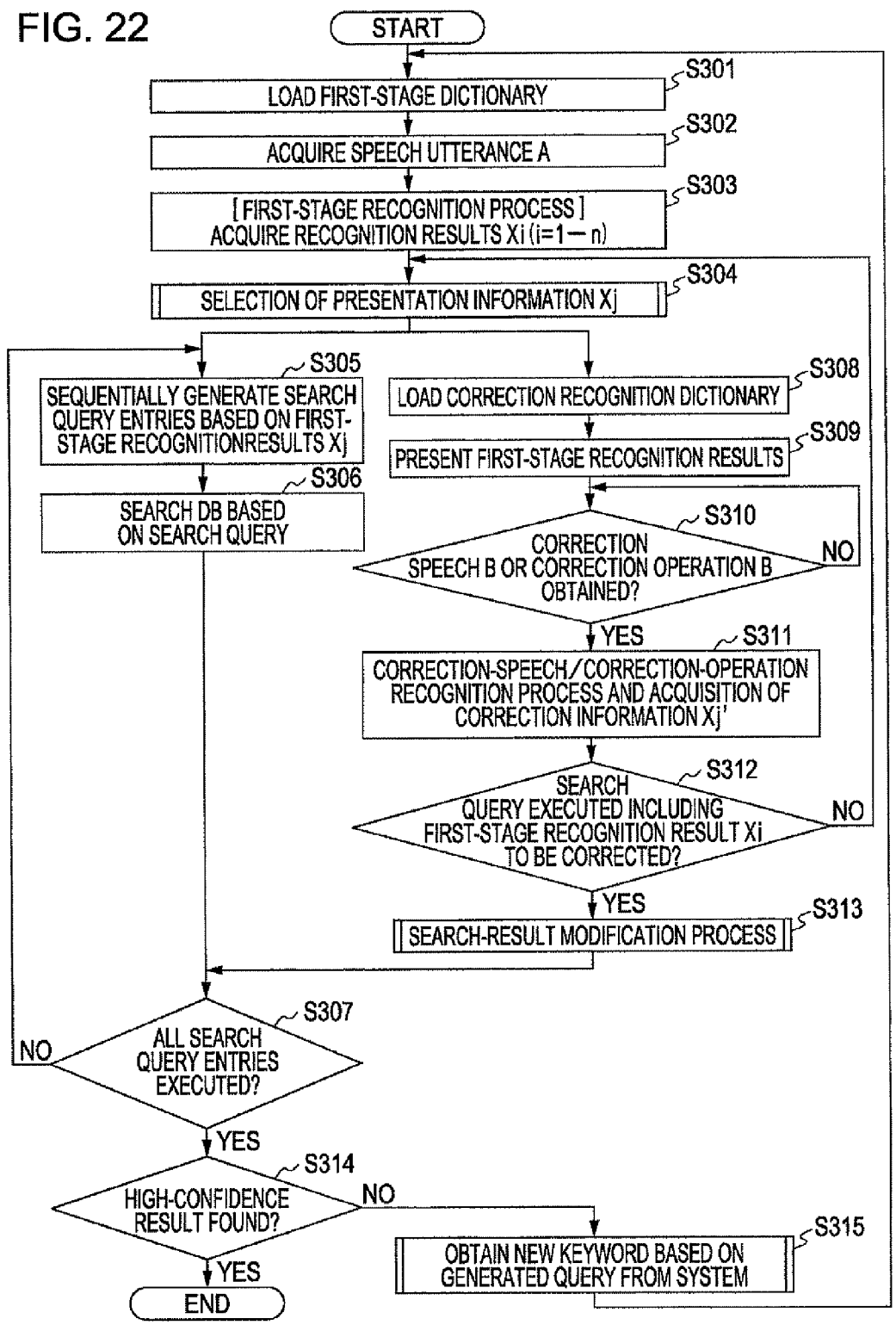
FIG. 22 is a flowchart showing a process of the speech recognition apparatus according to the fourth embodiment.
Figure 23:
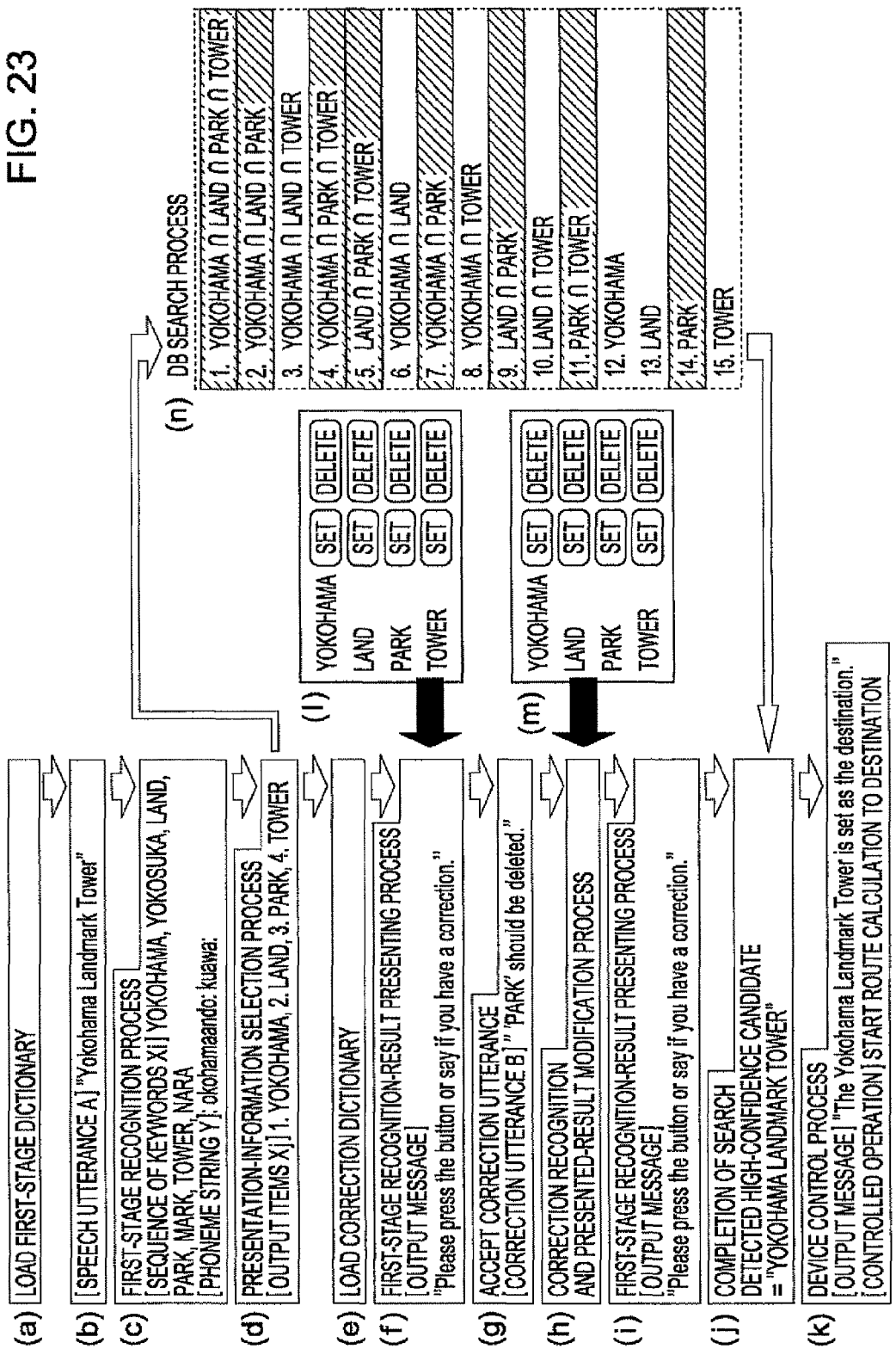
FIG. 23 is a diagram showing the flow of the process of the speech recognition apparatus according to the fourth embodiment.

FIG. 23 shows the relationship between user utterances and system responses according to the flowchart shown in FIG. 22. In FIG. 23, parts (a) to (k) show transactions between the system and the user, parts (l) and (m) show transitions of a screen that prompts the user for a correction, and part (n) shows the state of the DB search (the state of the issued search queries).

In step S301, as shown in part (a) of FIG. 23, a first-stage dictionary is loaded from the first-stage-dictionary storage unit 103. Then, the process proceeds to step S302, in which the first-stage recognition unit 102 acquires a speech utterance A input by the user via the speech input unit 101. For example, as shown in part (b) of FIG. 23, speech data of "Yokohama Landmark Tower" uttered by the user is acquired as the speech utterance A. Then, the process proceeds to step S303.

In step S303 the first-stage recognition unit 102 performs first-stage recognition using the first-stage dictionary and acquires n first-stage recognition result candidates Xi (i=1 to n). For example, as shown in part (c) of FIG. 23, seven recognized keyword candidates "YOKOHAMA", "YOKOSUKA", "LAND", "PARK", "MARK", "TOWER" and "NARA" are acquired as the first-stage recognition result candidates Xi. In this process, a phoneme string /okohamaando:kuawa:/ (":" denotes the symbol of a long-vowel phoneme) is recognized. The first-stage recognition unit 102 outputs the acquired first-stage recognition result candidates Xi to the first-stage recognition-result presenting unit 105 and the search query generation unit 111. Then, the process proceeds to step S304.

In step S304 the first-stage recognition-result presenting unit 105 selects the presentation-target recognition results Xj (j=the index of a recognition result to be presented) described above from among the first-stage recognition result candidates Xi acquired by the first-stage recognition unit 102. The first-stage recognition-result presenting unit 105 assigns priority to the first-stage recognition result candidates Xi in a manner similar to that in the first to third embodiments to select the presentation-target recognition results Xj. For example, as shown in part (d) of FIG. 23, four keywords "1. YOKOHAMA", "2. LAND", "3. PARK" and "4. TOWER" are selected as the presentation-target recognition results Xj. The first-stage recognition-result presenting unit 105 outputs the selected presentation-target recognition results Xj to the correction receiving unit 106 and the search query generation unit 111.

Then, the process proceeds to the DB search process based on the first-stage recognition results in steps S305 to S307 and the correction reception and recognition-result modification process in steps S308 to S313. First, the DB search process in steps S305 to S307 are described.

In step S305 the search query generation unit 111 sequentially generates a search query so as to cover all combinations of the keywords contained in the presentation-target recognition results Xj based on the presentation-target recognition results Xj input from the first-stage recognition-result presenting unit 105. For example, as shown in part (n) of FIG. 23, the search query generation unit 111 combines the four keywords "YOKOHAMA", "LAND", "PARK" and "TOWER" to sequentially generate search queries 1 to 15. The search query generation unit 111 outputs the generated search queries to the DB search unit 112. Then, the process proceeds to step S306.

In step S306 the DB search unit 112 searches the database entries stored in the DB 113 based on the search queries generated by the search query generation unit 111. The DB search unit 112 assigns scores to the search queries and performs scoring of the search results based on the scores assigned to the search queries and the search results obtained using the search queries. FIG. 24 shows an example of the search queries shown in part (n) of FIG. 23 and the assigned scores assigned to the search queries.

In the example shown in FIG. 24, more constrained conditions of the search query are assigned a higher score. For example, search query 12 including the single keyword "YOKOHAMA" as a search keyword is assigned a score of 5 points, and search query 6 "YOKOHAMA∩LAND" in which two keywords are used as search keywords in combination is assigned a score of 20 points.

When the total of 15 search queries shown in FIG. 24 is executed, the facility name "Yokohama Landmark Tower" is hit by search queries 3, 6, 8, 10, 12, 13 and 15. The DB search unit 112 calculates the assigned scores assigned to the search queries to perform scoring of the search result "Yokohama Landmark Tower" and calculates the recognition score of "Yokohama Landmark Tower". For example, the recognition score of "Yokohama Landmark Tower" is calculated by the following equation:

Recognition score of "Yokohama Landmark Tower"=assigned score(40)of search query 3+assigned score(20)of search query 6+assigned score(20)of search query 8+assigned score(20)of search query 10+assigned score(5)of search query 12+assigned score(5)of search query 13+assigned score(5)of search query 15=115.

The recognition score of "Yokohama Landmark Tower" may be calculated using another scoring method by setting a source score, e.g., one point, to each search query, dividing the source score by the number of hits to determine a recognition score of each search query and summing the recognition scores. For example, in the example shown in FIG. 24, since only one hit is found by search query 3, the recognition score of search query 3 is determined by dividing the source score (1) by the number of hits (1), and a score of 1 is obtained. As another example, since 1156 hits are found by search query 12, the recognition score of search query 12 is determined by dividing the source score (1) by the number of hits (1156), and a score of 0.00087 is obtained.

Then, the process proceeds to step S307, in which the DB search unit 112 determines whether or not all the search queries have been issued, i.e., whether or not the DB search using the search queries generated by the search query generation unit 111 has been completed. If all the search queries have been issued, the process proceeds to step S314, described below. If any search query that has not been issued remains, the process returns to step S305, in which the DB search based on the remaining search queries is performed.

Next, the correction reception and recognition-result modification process in steps S308 to S313 are described. In step S308 the correction receiving unit 106 combines the input presentation-target recognition results Xj with the correction vocabulary words stored in the correction-vocabulary storage unit 107 to generate a correction-recognition dictionary and loads the correction-recognition dictionary (see part (e) of FIG. 23). As in the first to third embodiments, the correction speech B that is possibly uttered by the user may include "delete" and/or "set". Therefore, the correction receiving unit 106 combines the keywords "YOKOHAMA", "LAND", "PARK" and "TOWER" selected as the presentation-target recognition results Xj and the correction vocabulary words "delete" and "set" with the garbage model to generate a correction recognition dictionary. Then, the process proceeds to step S309.

In step S309 the first-stage recognition-result presenting unit 105 presents the presentation-target recognition results Xj to the user. For example, as shown in part (l) of FIG. 23, the presentation-target recognition results Xj and a screen for "deleting" or "setting" each of the presentation-target recognition results Xj are displayed, and a system utterance, "Please press the button or say if you have a correction," is also output. Then the process proceeds to step S310, in which the correction receiving unit 106 waits for the correction speech B or a correction switch operation to be input. During this process, the processing of the steps S305 to S307 is independently performed, in which search queries are sequentially developed, and the search is performed.

If the correction receiving unit 106 determines that the correction speech B or correction switch operation has been input, the process proceeds to step S311. It is assumed that, as shown in part (g) of FIG. 23, "'PARK' should be deleted," is uttered by the user as the correction utterance B to delete the keyword "PARK" from among the presentation-target recognition results Xj. The correction switch operation is input when the user presses the "DELETE" button associated with the keyword "PARK" on the screen shown in part (l) of FIG. 23 to perform the operation corresponding to the utterance "'PARK' should be deleted."

In step S311 the correction receiving unit 106 performs recognition on the correction utterance B or the correction operation B to generate correction information Xj'. When the correction utterance B "'PARK' should be deleted" shown in part (g) of FIG. 23 is produced, the correction receiving unit 106 generates and obtains correction information Xj', here "keyword=PARK and correction information=DELETE". The correction receiving unit 106 outputs the generated correction information to the first-stage recognition-result presenting unit 105, the search query generation unit 111 and the DB search unit 112. Then, the process proceeds to step S312.

In step S312 the DB search unit 112 determines whether or not the DB search process using the search query including a presentation-target recognition result Xj to be corrected by the input correction information Xj' has been completed. If the search process has not been completed, the process returns to step S304, in which, as shown in part (h) of FIG. 23, the first-stage recognition-result presenting unit 105 modifies the presentation-target recognition results Xj so as to reflect the input correction information Xj'. The first-stage recognition-result presenting unit 105 also reflects the result in the displayed screen. For example, when the keyword "PARK" is deleted from the presentation-target recognition results Xj on the basis of the correction information Xj', the first-stage recognition-result presenting unit 105 displays the "PARK" button and the "DELETE" and "SET" buttons associated therewith in light color.

Further, the search query generation unit 111 corrects the generated search query so as to reflect the correction information Xj'. For example, the search query generation unit 111 deletes the search queries shown in shaded areas in part (n) of FIG. 23, i.e., the search queries including the keyword "PARK".

If the DB search unit 112 determines in step S312 that the search process has been completed, the process proceeds to step S313. In step S313 the correction is reflected in the recognition results by adding a penalty to assigned scores for deletion of the recognition results found by a search query that includes the corrected presentation-target recognition result Xj on the basis of the correction information Xj'. Alternatively, the correction may be reflected in the recognition results by performing processing such as adding a bonus in addition to an assigned score to the recognition results found by a search query that does not include the corrected presentation-target recognition result Xj. Further, the corresponding search results may be deleted, and the DB 113 may be searched again using search queries in which the correction information Xj' is reflected to perform scoring of the results.

Then the process proceeds to step S307, described above, in which if the DB search unit 112 determines that all search queries have been issued, the process proceeds to step S314. In step S314 the DB search unit 112 determines whether or not a result with high degree of confidence has been obtained as a result of the series of DB search operations. That is, the DB search unit 112 determines whether or not a recognition result whose recognition score calculated by the DB search unit 112 in the manner described above satisfies a predetermined condition has been found. Examples of the "predetermined condition" include, for example, the condition where "the first highest score is twice or more the second highest score". If the DB search unit 112 determines that a recognition result satisfying the predetermined condition has been found, a recognition result having sufficiently significant difference from the other candidates has been obtained. Then, as shown in part (j) of FIG. 23, the DB search unit 112 generates the obtained recognition result as the interpretation. Then, the process ends.

The speech recognition apparatus 100''' can be used in a navigation system. As shown in part (k) of FIG. 23, in the navigation system the destination spoken by the user is specified on the basis of the interpretation generated by the DB search unit 112. Voice guidance relating to the setting of the destination and route calculation to the destination is performed.

If the DB search unit 112 determines that no recognition results satisfying the predetermined condition have been found, the process proceeds to step S315. In step S315, since no results with a sufficient degree of confidence have been obtained, a message that prompts the user for a new utterance is output to obtain a new keyword. For example, when only the keyword "YOKOHAMA" is obtained, and no high-confidence search results have been found as a result of DB search although a large number of facilities results such as "Yokohama XXX" and "YYY Yokohama" have been retrieved, a query message such as "Yokohama what is the name of the facility?" is presented to the user. Then, the process returns to step S301.

When the user utters "Landmark Tower" in response to the message and new keywords "LAND" and "TOWER" are selected as presentation-target recognition results Xj, a new search query is generated based on the presentation-target recognition results Xj. Then, the DB search and scoring operations are performed. The DB search unit 112 combines the scores with the scores obtained by the first scoring operation, and then determines the degrees of confidence.

Figure 25A:
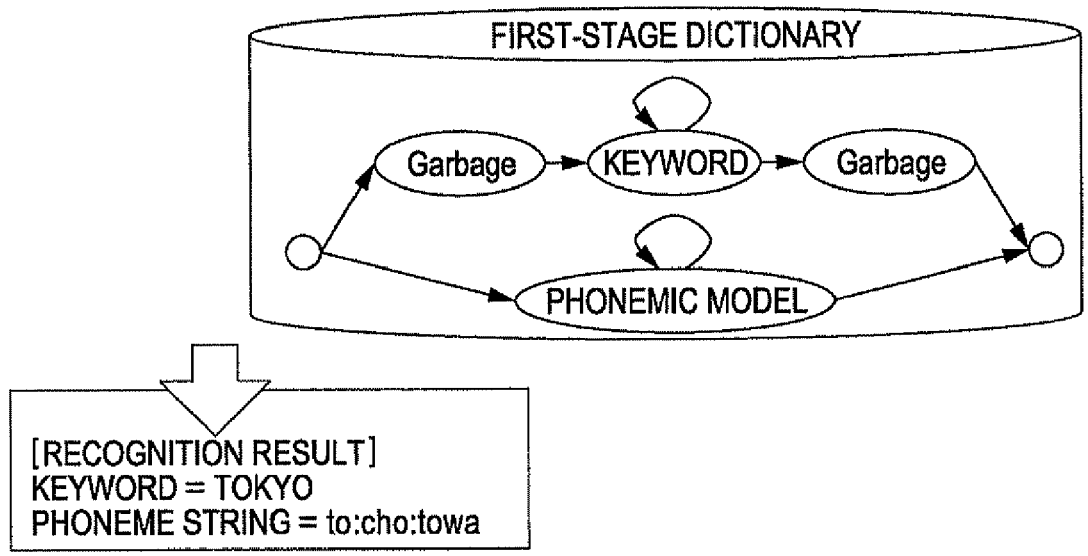

Another conceivable method performed in step S315 is to perform scoring based on the result of phonemic recognition. That is, the result of phonemic recognition (sub-word) is obtained in addition to the result of keyword recognition, and the phoneme string is matched with the phoneme-string data in the DB to perform scoring when no high-confidence results are obtained from the keyword-based DB search. FIG. 25A shows an example of a first-stage dictionary generated in the above method, and FIG. 25B shows an example of DB entries stored in the dictionary.

The DB shown in FIG. 25B contains phoneme-string data 25a corresponding to individual data entries (names of facilities). If no results with sufficient degree of confidence are obtained by keyword search, the phoneme strings stored in the DB and the phoneme strings obtained as a result of the first-stage recognition process are matched with each other to perform DP matching or Shift Continuous Dynamic Programming (Shift-CDP), which is known in the art, or the like to perform scoring. Scoring results 25b are obtained. Based on the scoring results 25b, the most closely matching phoneme string can be found.

In the phoneme-string comparing technique, the optimum matching of a recognized phoneme string with respect to arbitrary sequences of phonemes in the DB is calculated. Therefore, even if the speech utterance A is not completely identical to the data registered in the DB, a matching sequence of phonemes can be extracted. As an extension method, a vocabulary-free spoken document retrieval method using a phonetic code system called universal intermediate phonetic code system with less linguistic dependency, instead of phoneme strings, is also known in the art.

FIG. 25A shows the flow of a process performed when, for example, "Tokyo Tower" is input as a speech utterance A by way of example. From the speech utterance A, the keyword string "TOKYO" and the phoneme string /to:cho:towa:/ are obtained (":" denotes the symbol of a long-vowel phoneme). First, the DB search unit 112 performs keyword-based DB search and scoring. In this case, a large number of data entries like "Tokyo XXX" are detected from the keyword "TOKYO", and no results with sufficient degree of confidence are obtained (if the keyword "TOWER" is also obtained, however, the phrase "Tokyo Tower" is assigned a high score based on the search query "TOKYO∩TOWER").

Then, the DB search unit 112 performs matching and scoring on the phoneme string /to:cho:stowa:/. As a consequence, the score of the phrase "Tokyo Tower" is high, and if the degree of confidence satisfies the predetermined condition described above, the result is presented, and device control is performed.

According to the fourth embodiment described above, in the addition to the advantages of the first embodiment, the following advantages are achieved. That is, in the complex speech search technique in which a database search is performed using the search query generated on the basis of a first-stage recognition result, correction to the first-stage recognition result made by the user is accepted, thereby efficiently correcting the search query of the second-stage DB search. Therefore, the search targets can be appropriately narrowed down, and the resources required for the search can be reduced with an improvement of the accuracy of the search.

The speech recognition apparatuses according to the embodiments described above can be modified as follows, by example.

In the first to fourth embodiments described above, the first-stage recognition unit 102 performs keyword-spotting recognition to recognize a keyword included in the speech utterance A by way of example. However, the first-stage recognition unit 102 may perform word recognition, which is known in the art, to recognize a word included in the speech utterance A as a keyword.

In the first to fourth embodiments described above, the first-stage recognition-result presenting unit 105 outputs presentation-target recognition results Xj selected from first-stage recognition result candidates Xi recognized in the first-stage recognition process to a user. However, the first-stage recognition-result presenting unit 105 may output the first-stage recognition result candidates Xi recognized in the first-stage recognition process to the user.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A speech recognition apparatus comprising:
a speech input unit configured to receive an input of a speech utterance;
a keyword recognition unit configured to recognize a plurality of keywords included in the speech utterance as a recognition result using a processor;
a presentation unit configured to present the recognition result;
a correction input unit configured to receive a correction input for the recognition result;
a correction unit configured to correct the recognition result based on the correction input to create a correction result;
a dictionary generation unit configured to generate a standby-word dictionary as a union of recognition target vocabulary elements including the plurality of keywords corrected by the correction unit for recognizing the speech utterance; and
a speech utterance recognition unit configured to recognize the speech utterance using the standby-word dictionary.

2. The speech recognition apparatus according to claim 1 wherein the correction input unit is configured to receive the correction input by speech via the speech input unit.

3. The speech recognition apparatus according to claim 1, further comprising:
an operation unit operated by an operator wherein the correction input unit is configured to receive the correction input by operation of the operation unit.

4. The speech recognition apparatus according to claim 3 wherein the operation unit includes a touch panel.

5. The speech recognition apparatus according to claim 1 wherein the presentation unit is configured to select a keyword having a recognition score within a predetermined range from among the recognition result and to present the keyword.

6. The speech recognition apparatus according to claim 1 wherein the presentation unit is configured to select at least two keywords based on a similarity of acoustic features from among the recognition result and to present the selected keywords.

7. The speech recognition apparatus according to claim 1 wherein the presentation unit is configured to select a keyword based on a data size of the standby-word dictionary from among the recognition result and to present the selected keyword.

8. The speech recognition apparatus according to claim 1 wherein the presentation unit is configured to select keywords based on a probability of appearing within a recognition-target vocabulary element from among the recognition result and to present the selected keywords.

9. The speech recognition apparatus according to claim 1 wherein the presentation unit, the correction input unit, and the correction unit are configured to operate in parallel with the dictionary generation unit and the speech utterance unit.

10. The speech recognition apparatus according to claim 1 wherein the correction input is at least one of a deletion from and an addition to the recognition result.

11. The speech recognition apparatus according to claim 1 wherein the dictionary generation unit is further configured to specify an appearance position within the speech utterance of each of the at least one keyword and to generate the standby-word dictionary based on the appearance position.

12. The speech recognition apparatus according to claim 1 wherein the dictionary generation unit is further configured to generate a search query according to the correction result for searching the standby-word dictionary and to generate the standby-word dictionary so as to include a recognition-target vocabulary element retrieved using the search query.

13. A speech recognition apparatus comprising:
a microphone for receiving a speech utterance;
means for recognizing at least one keyword included in the speech utterance as a recognition result;
means for presenting the recognition result;
means for receiving a correction to the recognition result;
means for correcting the recognition result based on the correction to generate a correction result;
means for generating a standby-word dictionary using the correction result;
means for recognizing the speech utterance using the standby-word dictionary; and
means for operating the presenting means, the receiving means and the correcting means in parallel with the generating means and the means for recognizing the speech utterance.

14. The speech recognition apparatus according to claim 13 wherein the means for recognizing at least one keyword comprises a processor configured to recognize a plurality of keywords and the generating means comprises the processor configured to generate the standby-word dictionary as a union of recognition-target vocabulary elements including the plurality of keywords corrected by the correcting means.

15. A speech recognition method comprising:
    receiving a speech utterance;
    presenting at least one keyword included in the speech utterance;
    correcting the at least one keyword;
    generating a standby-word dictionary using a processor, the standby-word dictionary being a union of recognition target vocabulary elements including the at least one keyword as corrected; and
    recognizing the speech utterance using the standby-word dictionary.

16. The speech recognition method of claim 15, further comprising:
    selecting from among the at least one keyword a selected keyword having a recognition score within a predetermined range; and
    presenting the selected keyword.

17. The speech recognition method of claim 15, further comprising:
    selecting from among the at least one keyword a selected keyword based on a standby-word dictionary data size of the selected keyword; and
    presenting the selected keyword.

18. The speech recognition method of claim 17, further comprising:
    selecting from among the at least one keyword a selected keyword having the largest standby-dictionary data size; and
    presenting the selected keyword.

19. The speech recognition method of claim 15 wherein presenting the at least one keyword further includes recognizing a plurality of keywords, the method further comprising:
    selecting from among the plurality of keywords at least two selected keywords based on a conflict in meaning between the selected keywords; and
    presenting the selected keywords.

20. The speech recognition method of claim 15 wherein presenting the at least one keyword further includes recognizing a plurality of keywords, the method further comprising:
    selecting from among the plurality of keywords at least two selected keywords based on an interphoneme distance between the selected keywords; and
    presenting the selected keywords.

* * * * *